United States Patent

(12) United States Patent
Ezzerg et al.

(10) Patent No.: US 12,100,383 B1
(45) Date of Patent: Sep. 24, 2024

(54) VOICE CUSTOMIZATION FOR SYNTHETIC SPEECH GENERATION

(71) Applicant: Amazon Technologies, Inc., Seattle, WA (US)

(72) Inventors: Abdelhamid Ezzerg, Cambridge (GB); Piotr Tadeusz Bilinski, Warsaw (PL); Thomas Edward Merritt, Downham Market (GB); Roberto Barra Chicote, Cambridge (GB); Daniel Korzekwa, Gdansk (PL); Kamil Pokora, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 17/707,203

(22) Filed: Mar. 29, 2022

Related U.S. Application Data

(60) Provisional application No. 63/309,762, filed on Feb. 14, 2022.

(51) Int. Cl.
*G10L 13/047* (2013.01)
*G06N 3/045* (2023.01)
*G10L 25/30* (2013.01)

(52) U.S. Cl.
CPC ............ *G10L 13/047* (2013.01); *G06N 3/045* (2023.01); *G10L 25/30* (2013.01)

(58) Field of Classification Search
CPC ......... G10L 13/00; G10L 13/02; G10L 13/08; G10L 13/047; G10L 15/00; G10L 15/02;
(Continued)

(56) References Cited

U.S. PATENT DOCUMENTS 11,017,763 B1* 5/2021 Aggarwal ............... G10L 13/08
2020/0027247 A1* 1/2020 Minnen .................. G06N 20/00
2021/0217431 A1* 7/2021 Pearson ................. G10L 21/013

FOREIGN PATENT DOCUMENTS

CN         111276119 A  *  6/2020  ............ G10L 13/02

OTHER PUBLICATIONS

Sun, H., Cai, Y., Li, L., & Wang, D. (2019). On investigation of unsupervised speech factorization based on normalization flow. arXiv preprint arXiv:1910.13288 (Year: 2019).*

(Continued)

*Primary Examiner* — Daniel C Washburn
*Assistant Examiner* — Sean E Serraguard
(74) *Attorney, Agent, or Firm* — Pierce Atwood LLP

(57) ABSTRACT

Voice customization is an application of voice synthesis that involves synthesizing speech having certain voice characteristics, and/or modifying the voice characteristics of human speech. Certain techniques for voice customization may be used in conjunction with compressing speech for storage and/or transmission. For example, speech may be received at a first device and transformed into a latent representation and/or compressed for storage and/or transmission to a second device. The system may use normalizing flows to transform the source audio to a latent representation having a desired variable distribution, and to transform the latent representation back into audio data. A flow model may conditioned using first speech attributes when transforming the source audio, and an inverse flow model may use second speech attributes when transforming the latent representation back into audio data. The first and/or second speech attributes may be modified to alter voice characteristics of the transmitted speech.

20 Claims, 12 Drawing Sheets

(58) Field of Classification Search
CPC ......... G10L 15/16; G10L 15/22; G10L 15/26; G10L 15/063; G10L 25/00; G10L 25/30; G06N 3/00; G06N 3/045
See application file for complete search history.

(56) References Cited

OTHER PUBLICATIONS

Prenger, R., Valle, R., & Catanzaro, B. (May 2019). Waveglow: A flow-based generative network for speech synthesis. In ICASSP 2019-2019 IEEE International Conference on Acoustics, Speech and Signal Processing (ICASSP) (pp. 3617-3621). IEEE. (Year: 2019).*

* cited by examiner

VOICE CUSTOMIZATION FOR SYNTHETIC SPEECH GENERATION

RELATED APPLICATIONS

This application claims the benefit of priority of U.S. Provisional Patent Application 63/309,762, filed Feb. 14, 2022, and entitled "SYNTHETIC SPEECH PROCESSING," the contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve generating synthesized speech from, for example, text.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
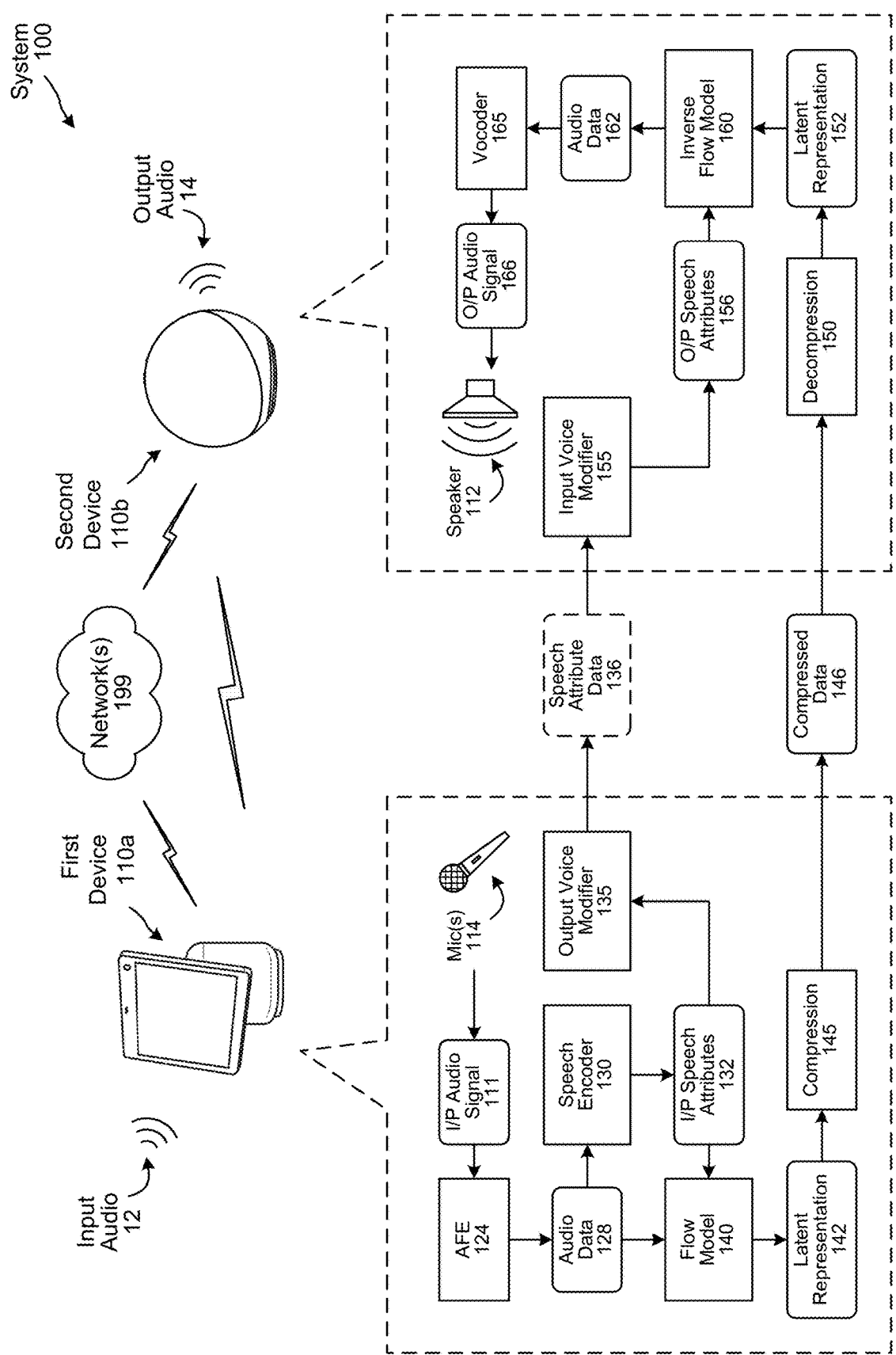
FIG. 1 is a conceptual diagram illustrating components of a system for speech transmission with voice customization, according to embodiments of the present disclosure.

Computer systems may employ machine learning algorithms to perform tasks that may involve processing data to recognize patterns, make inferences, and/or predict future events. Example applications of machine learning algorithms include encoding and decoding data, classifying data into categories, predicting subsequent data in a sequence, etc.

Machine learning models may implement such algorithms and apply them to various natural language processing (NLP) tasks such as automatic speech recognition (ASR), natural language understanding (NLU), natural Language Generation (NLG), and text-to-speech (TTS). ASR, NLU, NLG, and/or TTS may be used together in a speech-processing system that a user can interact with by providing natural language inputs (e.g., human speech and/or text) and receiving natural language outputs (e.g., synthesized speech and/or text).

Voice customization is an application related to TTS that involves synthesizing speech with certain voice characteristics and/or changing the voice characteristics of human and/or synthetic speech. This disclosure describes techniques for applying voice customization and/or anonymization in conjunction with compressing speech for storage and/or transmission. For example, speech may be received at a first device and sent to a second device for output as audio. Between receipt and output, the speech may be compressed for storage and/or transmission. Techniques for voice customization may be applied to the speech on the source side (e.g., before/during compression) and/or on the destination side (e.g., during/after decompression) to alter the sound of the voice. Such techniques are not limited to human speech, and may also be used to modify computer-generated synthesized speech.

The techniques described herein may process the speech data using normalizing flows or other density-based model. Normalizing flows are computer models that can implement mathematical functions to transform data in a reversible manner. For example, a computer may process data using a flow model that implements a "flow" of one or more functions to generate a latent representation of the data. The computer (or a different computer) may process the latent representation of the data using an inverse flow model that implements the inverse of the one or more functions to recreate the original data.

Normalizing flows may be configured to transform data having a certain observable variable distribution into a latent representation having a different base distribution. For example, a normalizing flow may be configured to transform audio data representing speech into a latent representation having a variable distribution that is approximately Gaussian (although many different variable distributions are possible). Transforming data into a form that has a known variable distribution may be useful, for example, for preparing the data for efficient compression.

A compression scheme may operate based on the distribution of data to be compressed. By configuring a normalizing flow to convert the distribution of an observed variable (e.g., the speech data) to a latent representation having a known distribution, a compression scheme may be able to achieve high compression ratios, potentially approaching theoretical limits.

Normalizing flows may be implemented as a machine learning model such as a neural network. The normalizing flow may be configured by training the machine learning model to transform a sample variable distribution into, for example, a Gaussian distribution. In the case of transforming speech data, a separate component such as a speech encoder may determine speech attributes of given speech. The machine learning model may use the speech attributes to transform the speech data to generate the latent representation. The latent representation may be compressed and stored and/or transferred to a second device. The second device may decompress the latent representation and apply an inverse flow to recreate the speech data.

When the second device applies the inverse flow to recreate the speech data, it may use the speech attributes to configure the inverse flow to recreate the variable distribution of the original speech data. In some cases, however, the speech attribute data used to recreate the speech data from the latent representation may differ from the speech attributes used to transform the original speech data into the latent representation. If the speech attributes differ, the reconstructed speech data may have different voice characteristics from the original speech.

Thus, speech attributes may be modified to, for example, make the reconstructed speech sound like a different speaker (e.g., a celebrity) or a wholly synthetic speaker (e.g., not correlating to any particular known voice). In some implementations, the speech attributes may be modified to change particular characteristics of voice such as age, gender, accent, etc. In some implementations, the speech attributes need not be shared between the source device and the destination device; rather, the destination device may use default, alternative, and/or user-selected speech attributes to reconstruct the speech data. In some implementations, the voice customization may be used to obscure identifiable characteristics of the source voice; for example, to anonymize the speaker.

In some implementations, the system may be configured to transmit and/or modify different types of data such as video data. Whereas audio data may be processed/transmitted in discrete segments such as a frames, video data may be processed/transmitted as a sequence of images. Operation of the flow and/or inverse flow models may be the same for audio and video; and, in some cases, audio and video may be processed and/or transferred together as in, for example, a video call between two users.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating components of a system 100 for speech transmission with voice customization, according to embodiments of the present disclosure. The system 100 may include a first device 110a (such as the speech-detection device with display shown in FIG. 1) in communication with a second device 110b (such as the speech-detection device also shown in FIG. 1) over one or more computer networks 199. In some implementations, the first device 110a and the second device 110b may be in direct communication via, for example, a wired and/or wireless connection. In various implementations, the first device 110a and/or the second device 110b may be different from the configurations illustrated in FIG. 1, and may be any of the devices 110 illustrated in FIG. 12 or others. The first device 110a may receive input audio 12 such as human or synthesized speech, and transmit data representing the speech to the second device 110b, which may output audio 14 represent the same speech and/or modified speech. In operation, either or both the first device 110a and the second device 110b may receive input audio data 12, modify speech, and/or present output audio 14. Accordingly, any component(s) described with one device may also be present in the other device. The speech may be modified using one or more of the various techniques described below.

The first device may receive the input audio 12 via a microphone or microphone array 114. An acoustic front end (AFE) 124 may receive the resulting input audio signal 111 and digitize it to generate audio data 128. The audio data 128 may be in the form of, for example, Mel-spectrogram data. The AFE 124 is described in additional detail below with reference to FIG. 5.

A speech encoder 130 may receive the audio data 128 and, if speech is present, determine input speech attribute data 132 of the speech. The input speech attribute data 132 may be, for example, a vector or other data structure that can quantify certain voice characteristics that differ from speaker to speaker. The input speech attribute data 132 may be, for example, speaker embedding data that represents identifiable voice characteristics as determined by, for example, a trained model such as a neural network encoder. In other words, the speech attribute data 132 as determined by the speech encoder 130 may represent quantified characteristics representing how a particular voice differs from other voices over which the speech encoder 130 may have been trained. In some implementations, the speech encoder 130 may be trained on the same dataset used to train the flow model 140 and/or inverse flow model 160, and/or models of the TTS component 580. In some implementations, the speech attribute data 132 may include labels such as age, gender, pitch, etc. The labels may be estimated and/or applied based on training, or selected by a user.

A flow model 140 may receive the audio data 128 and the input speech attribute data 132, and process the audio data 128 to generate a latent representation 142. The latent representation 142 may represent data in a latent feature space. Data points represented in the audio data 128 may be transformed to positions within the latent feature space, where distances between respective positions within the latent feature space may correspond to similarity between the data points. In some implementations, the latent feature space may have fewer dimensions than the audio data 128. The flow model 140 may be software and/or logic configured to process an input using one or more mathematical functions to generate the latent representation 142. The flow model 140 may include a machine learning model such as a neural network configured and/or trained to transform an observable variable (e.g., the audio data 128) having a certain distribution (e.g., a distribution typical of speech data) into a latent representation having a different base distribution (e.g., a Gaussian distribution). The latent representation may be subject to an inverse of the transformation performed by the flow model 140 to recreate the original data. For example, and as shown in FIG. 1, an inverse flow model 160 may receive a latent representation 152 and generate audio data 162.

The flow model 140 may include trainable parameters (e.g., input weights of nodes of neural network layers) that be trained using sample data. For example, the flow model 140 may be trained using a dataset representing samples of audio data 128 corresponding to speech, and the parameters may be adjusted such that the output of the flow model 140 has a variable distribution approximating a predetermined base distribution for various examples of speech. The flow model 140 (and/or the inverse flow model 160) are described in additional detail below with reference to FIG. 2. In some implementations, the flow model 140 and/or the inverse flow model 160 may be replaced by another density-based model such as a diffusion network. A diffusion model may include a Markov chain of diffusion steps that add random noise to data. An inverse of the diffusion process may generate desired data samples from the noise. A diffusion model may be lossy in that the generated data sample may include noise not present in the original data. In contrast, a flow-model implementing Normalizing flows may include invertible transformations that may reconstruct the source data from the latent state without distortion and/or noise.

In some implementations, the flow model 140 may receive the input speech attributes data 132 from the speech encoder 130. The speech attribute data 132 may condition the flow model 140 to transform the audio data 128 into the latent representation 142; that is, the speech attribute data 132 may indicate to the flow model 140 how the particular voice represented in the audio data 128 differs from other voices. The input speech attribute data 132 may thus facilitate transforming the variable distribution of the audio data 128 to predetermined base distribution. Similarly, speech attribute data may be used by the inverse flow model 160 to recreate the speech; however, and as described in additional detail below, the inverse flow model 160 may transform the latent representation using speech attribute data that differs from that of the original speech. In such cases, the resulting reconstructed speech may differ in one or more voice characteristics from the original speech.

Returning to the operations on the first device 110a, a compression component 145 may receive the latent representation 142 and apply one or more compression algorithms to generate the compressed data 146. The algorithm(s) chosen for implementation by the compression component 145 may depend on the variable distribution chosen for the latent representation 142. For example, certain compression algorithms may achieve high compression ratios for data having a Gaussian distribution. In various implementations, the compression component 145 (and/or the decompression component 150) may employ one or more of various compression algorithms such as arithmetic encoding, Huffman encoding, run-length encoding, etc. In some implementations, the compression component 145 and/or the decompression component 150 may use one or more lossy compression schemes; however, the reconstructed speech may include artifacts that arise due to changes in the latent representation 142 that are propagated through the transformation back to audio data. In some implementations, the compression algorithm implemented by the compression component 145 may depend on the bandwidth available for transmission of the compressed data 146. For example, if the compression component 145 determines that the compressed data 146 may be send over a connection having sufficient bandwidth, the compression component 145 may use a lossless compression algorithm; however, if the compression component 145 determines that the bandwidth of the connection is constrained, the compression component 145 may use a lossy compression algorithm (e.g., to reduce a number of bytes to be transmitted for a given amount of latent representation data 142). The first device 110a may send the compressed data 146 to the second device 110b.

The second device 110b may receive the compressed data 146 and decompress it using the decompression component 150 to generate the latent representation 152. If the compression scheme is lossless, the latent representation 152 may be the same as the latent representation 142. If the compression scheme is lossy, however, the latent representation 152 may differ slightly from the latent representation 142. An inverse flow model 160 may receive the latent representation 152 and reconstruct the audio data 162. The inverse flow model 160 may perform one or more functions that represent an inverse of the function(s) performed by the flow model 140. Such transformations may be lossless, so the audio data 162 may be the same, or very similar to, the audio data 128, depending on the compression scheme and/or speech attributes used.

In some cases, however, the speech attributes used by the inverse flow model 160 may differ from those used by the flow model 140. If the output speech attribute data 156 differ from the input speech attribute data 132, speech represented in the reconstructed audio data 162 may exhibit different voice characteristics from those of the original speech represented in the audio data 128. In some implementations, the speech attributes may be modified by the first device 110a and/or the second device 110b to alter the voice characteristics of the transmitted speech. In some implementations, the input speech attribute data 132 may be withheld by the first device 110a, thus "anonymizing" the source speech by withholding identifiable characteristics of the speech. If the first device 110a does not provide speech attribute data 136 (e.g., shared speech attribute data 136 as shown in FIG. 1), the second device 110b may use default, alternative, and/or user-selected speech attributes to condition the inverse flow operations. The resulting audio data 162 may thus represent intelligible speech, but with fewer or no identifiable characteristics of the source speech.

Either the first device 110a or the second device 110b may perform operations to modify the voice characteristics of the source speech. The first device 110a may determine input speech attribute data 132 of the source speech, and the second device 110b may reconstruct the speech using the output speech attribute data 156. Any differences between the input speech attribute data 132 and the output speech attribute data 156 may modify the voice characteristics of the speech. The first device 110a may, in some cases, share speech attribute data 136 with the second device 110b. Thus, to make voice modifications on the sender side, the first device 110a may use an output voice modifier 135 to modify contents of the input speech attribute data 132, and send the speech attribute data 136 to the second device 110b (e.g., with the compressed data 146). Similarly, to make voice modification on the receiver side, the second device may use an input voice modifier 155 to modify the speech attribute data 136 to generate the output speech attribute data 156, which may then be used by the inverse flow model 160 to reconstruct the speech.

The output voice modifier 135 and/or the input voice modifier 155 may modify voice characteristics of speech in a number of ways. In some implementations, the output voice modifier 135 and/or the input voice modifier 155 may receive stored speech attributes for a particular voice; e.g., a celebrity, user, and/or other person who has given position for their particular voice characteristics to be used for reconstructing speech. In some implementations, the output voice modifier 135 and/or the input voice modifier 155 may receive speech attributes entered via a user interface component. For example, the system 100 may include features that allow a user to adjust parameters of their voice characteristic including, but not limited to, age, pitch, gender, etc. The output voice modifier 135 and/or the input voice modifier 155 may include one or more models that may convert the selected parameters into speech attribute data for modifying the source speech. The resulting speech attribute data may be provided to the flow model 140, such that the speech is modified as it is transformed into the latent representation 142. Additionally or alternatively, the resulting speech attribute data may be provided to the inverse flow model 160 such that the speech is modified as it is reconstructed from the latent representation.

In some cases, the first device 110a may share no speech attribute data 136 with the second device 110b. The input voice modifier 155 may therefore have no speech attribute data to modify. Accordingly, the input voice modifier 155 (and/or another component) may use default and/or alternative speech attributes. Additionally or alternatively, the input voice modifier 155 may use user-selectable speech attributes. For example, a user may select from different voice options that represent different voices (e.g., celebrities), or different voice characteristics (e.g., age, pitch, gender, etc.).

The second device 110b may receive the compressed data 146 (and, in some cases, the speech attribute data 136) and decompress it using the decompression component 150 to generate the latent representation 152. The inverse flow model 160 may receive the latent representation 152 and output speech attribute data 156 (e.g., as received and/or modified by the input voice modifier 155), and generate the audio data 162. The audio data 162 may represent the reconstructed speech; for example, in spectrogram form. A vocoder component 165 may convert the audio data 162 into an output audio signal 166 suitable for amplification and/or output as an audible signal from the loudspeaker 112.

In some implementations, the system 100 may be configured to transmit and/or modify different types of data such as video data and/or other non-speech audio data (e.g., paralinguistic sounds, certain background noises, etc.). Whereas audio data may be processed/transmitted in discrete segments such as a frames (e.g., an x-dimensional spectrogram), video data may be processed/transmitted as a sequence of images (e.g., a y×z pixel image). Audio and video may be received and processed together as in, for example, a video call between two users. Operation of the flow and/or inverse flow models 140/160 may be the same for audio and video; and, in some cases, audio and video may be processed and/or transferred together using the same model. Processing audio and video together may benefit from certain correlations; for example, facial movements corresponding to speech.

In some implementations, audio, video, and/or other data may be output by various means. In some cases, the output may be in a different form from what was received. For example, two-dimensional video of a person may be transformed to a three-dimensional representation in a virtual reality environment. In some cases, features of the face may change (e.g., as performed using "filter" apps). In another example, movements determined from video may be processed to actuate an animatronic head/body.

Figure 2:
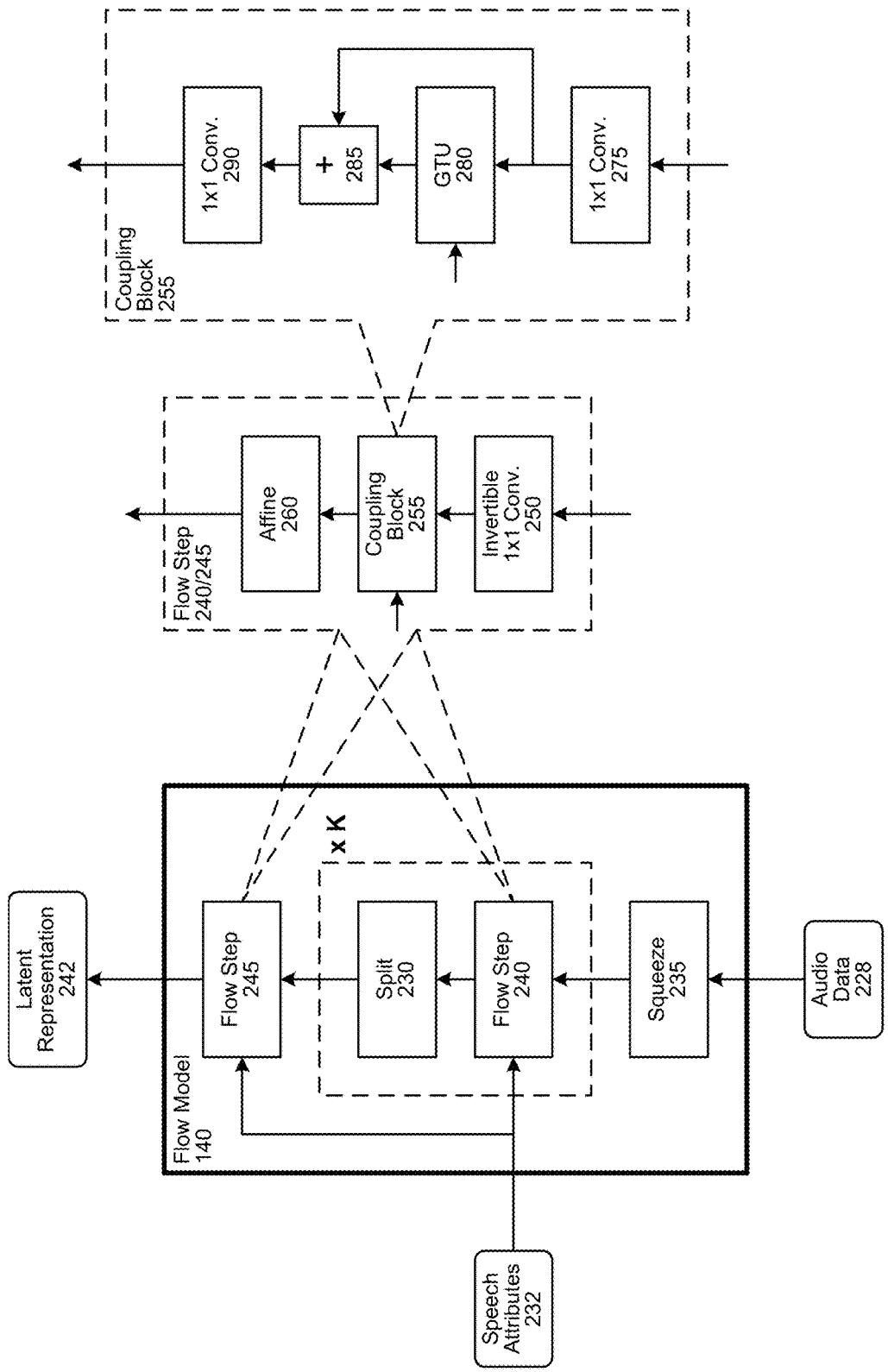
FIG. 2 is a conceptual diagram illustrating details of a flow model for generating a latent representation of speech data, according to embodiments of the present disclosure.

FIG. 2 is a conceptual diagram illustrating details of a flow model 140 for generating a latent representation of speech data, according to embodiments of the present disclosure. The flow model 140 illustrated in FIG. 2 may be a trainable neural network architecture. Once trained (e.g., to transform audio data 228 to a latent representation 242 having a desired variable distribution), the inverse of the various flow steps 240 and/or 245 may be determined and used to configure the inverse flow model 160 to reconstruct audio data from the latent representation 242.

Normalizing flows are invertible, generative networks. They are a series of functions that are invertible, such that the analytical inverse of the function can be calculated. Normalizing flows are bijective functions; that is, for each input, a unique output exists, and vice-versa. Thus, they can be used to define an invertible mapping between a data distribution and a prior distribution. Normalizing flows can be implemented with neural networks. To preserve invertibility, notes of a neural network flow model should employ monotonic activation functions such that each combination of inputs has a unique output, and vice-versa. The flow models 140 and/or 160 may be similar to models used in Flow-TTS and/or Glow-TTS implementations of normalizing flows.

Flow models may be trained using, for example, a negative log-likelihood loss function. The training dataset may include samples of audio data 228. Speech attribute data 232 for each sample of the audio data 228 may be received with the dataset and/or generated for/during training, for example, using the speech encoder 130. At each training iteration, the latent representation 242 may be compared to the desired data distribution (e.g., Gaussian) and gradients may be propagated back through the layers of the flow model 140. When training is complete (e.g., when the loss falls below a threshold and/or when the loss experiences diminishing returns for additional training iterations), the inverse of the various flow steps 240 and 245 may be calculated to generate the inverse flow model 160.

Runtime operation of the flow model 140 is similar in that the flow model 140 receives audio data 228 and the speech attribute data 232, and outputs the latent representation 242. And the inverse flow model 160 may operate in reverse; that is, by receiving the latent representation 242 and the speech attribute data 232 and outputting audio data 228; however, in cases involving voice customization, the speech attributes used by the inverse flow model 160, and the resulting audio data produced, may differ from that of the flow model 140.

The flow model 140 may receive the audio data 228 and process it with a first flow step 240. In some implementations, one or more squeeze components 235 and/or a split components 230 may implement a multi-scale architecture. For example, a squeeze operation may take two frames of data having d dimensions and combine them to generate one frame of data having 2d dimensions. Implementing such multi-scale architecture may make the model more stable during training. Flow steps 240 and 245 may process the audio data 228 based on conditioning data such as the speech attribute data 232. The output of the first flow step 240 may be, for example, a vector. In some implementations, a split component 230 may split the vector to reduce its dimensionality. The first flow step 240 (e.g., and split component 230 and/or squeeze component 235 operations) may be repeated K times, where K may be 1, 4, 16, 32, etc. number of repetitions. The number of repetitions may be a hyperparameter set by designed and/or may be empirically adjusted to balance performance of the flow model 140 against memory and/or compute constraints. In some implementations, a split component 230 may follow every flow step 240. In other implementations, a split component 230 may follow every n flow steps 240, where n may be 1, 4, 8, etc. Following the K repetitions, the flow model 140 includes a second flow step 245. Processing of the second flow step 245 may be conditioned using the speech attribute data 232. The second flow step 245 may output the latent representation 242.

The flow steps 240 and/or 245 may be configured as further shown in FIG. 2. A flow step may include an invertible convolution layer 250 (e.g., implementing a 1×1 convolution) that receives the input, which may be the audio data 228 in the case of the first of the K flow steps 240, or which may be the output of one of the flow steps 240 and/or split components 230. A coupling block 255 may receive the speech attribute data and process the output of the convolution layer 250. The coupling block and an affine layer 260 may make up an affine block. An affine block may implement a type of normalizing flow in which the input is split into two subsets, which may be mutually exclusive. Data in a first subset of the input is not modified as it passes through the affine block; however, the data in the first subset may be used to transform the data in the second subset as it passes through the affine block. The overall function implemented by the affine block may be an invertible transformation that can be reversed without loss (e.g., by a corresponding block of the inverse flow model 160).

In further detail, the coupling block 255 of the flow step may include the components shown in FIG. 2. The coupling block 255 may include another convolution layer 275 (e.g., implementing a 1×1 convolution). The output of the convolution layer 275 may be split, with a first portion going to a gating mechanism such as the gated tanh unit (GTU) block 280 and a second portion bypassing the GTU block 280. The GTU block 280 may process the output of the convolution layer 275 and the speech attribute data 232 using a combination of hyperbolic tangent (tanh) and sigmoid activation functions. The output of the GTU block 280 may be recombined with the second portion of the convolution layer 275 output at a block 285. The combined data may pass through another convolution layer 290 before outputting the coupling block 255.

Figure 3:
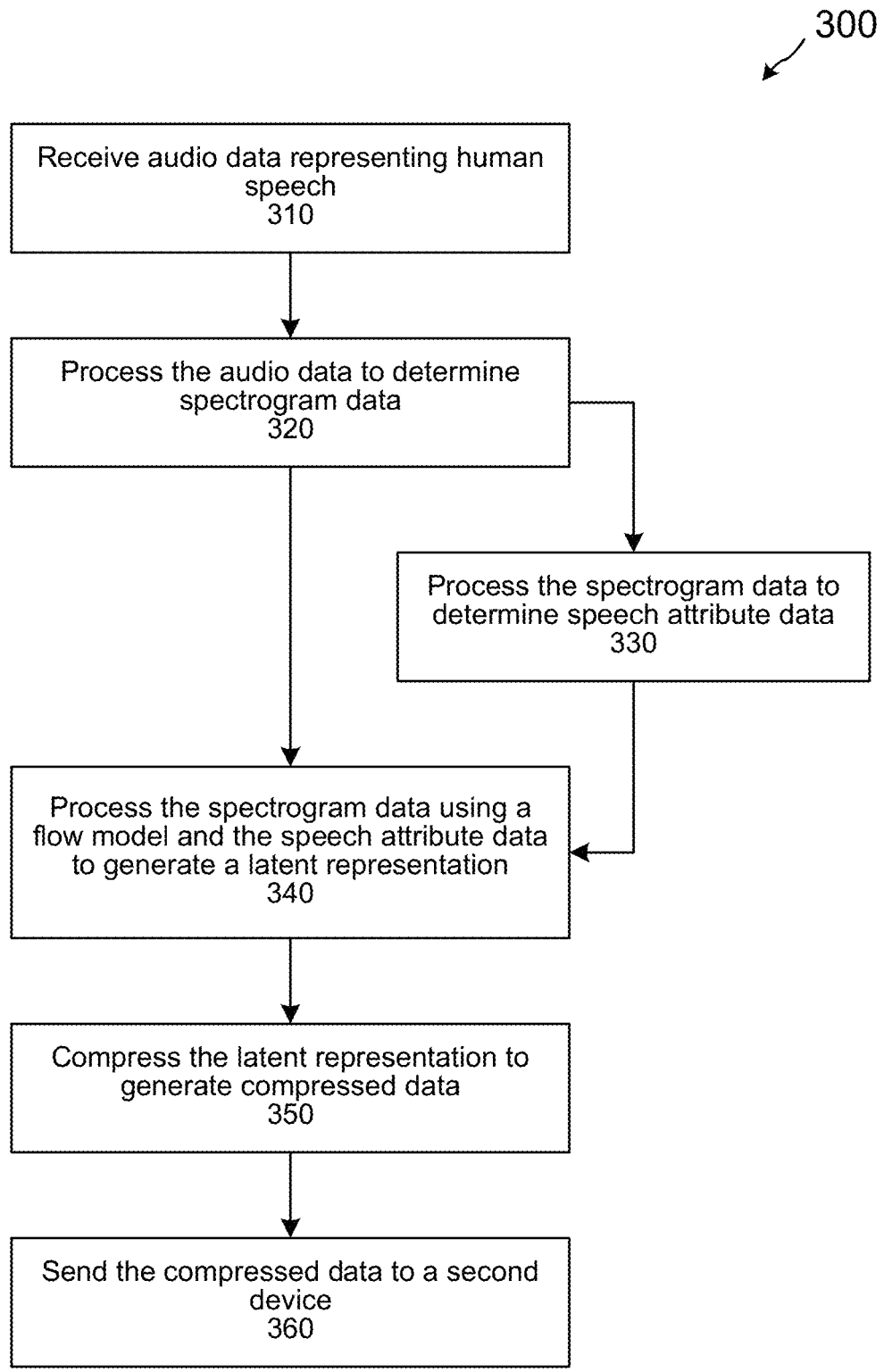
FIG. 3 is a flowchart illustrating an example method of receiving speech data, generating a latent representation, and compressing it for storage and/or transmission, according to embodiments of the present disclosure.

FIG. 3 is a flowchart illustrating an example method 300 of receiving speech data, generating a latent representation, and compressing it for storage and/or transmission, according to embodiments of the present disclosure. The method 300 may be performed by one or more devices 110 of the system 100, for example, a user device such as the first device 110a shown in FIG. 1. The method 300 may include receiving (310) audio data representing speech. The speech may be human speech received from a microphone and/or pre-recorded and retrieved from storage. Additionally or alternatively, the speech may be synthesized speech generated by, for example, the TTS component 580 or another TTS system. The audio data may represent an audio signal digitized from an analog signal (e.g., encoded in a pulse code modulation format). The method 300 may include processing (320) the audio data to determine spectrogram data representing the speech. An acoustic front end such as the AFE 124 may convert the audio data to a spectrogram format; for example, Mel-spectrograms.

The method 300 may include processing (330) the spectrogram data to determine speech attribute data. The speech attribute data may represent identifiable voice characteristics of the speech. A speech encoder, such as the speech encoder 130, may generate a vector or other data structure that can quantify certain voice characteristics that differ from speaker to speaker. The speech attribute data may be speaker embedding data that represents identifiable voice characteristics as determined by, for example, a trained model such as a neural network encoder. In some implementations, the speech attribute data may include labels such as age, gender, pitch, etc. The labels may be estimated and/or applied based on training of the speech encoder.

The method 300 may include processing (340) the spectrogram data using a first flow model and the speech attribute data to generate a latent representation having a predetermined variable distribution. The variable distribution may be, for example, a Gaussian distribution. The first flow model may operate as described previously with reference to the flow model 140 shown FIG. 2. The flow model may perform a series of invertible functions to transform the spectrogram data to the latent representation. The latent representation may represent the spectrogram data in a latent feature space. Data points represented in the spectrogram data may be transformed to positions within the latent feature space, where distances between respective positions within the latent feature space may correspond to similarity between the data points.

In some implementations, the system 100 may be configured to transmit and/or modify different types of data such as video data and/or other non-speech audio data (e.g., paralinguistic sounds, certain background noises, etc.). Whereas audio data may be processed/transmitted in discrete segments such as a frames (e.g., an x-dimensional spectrogram), video data may be processed/transmitted as a sequence of images (e.g., a y×z pixel image). Audio and video may be received and processed together as in, for example, a video call between two users. Operation of the flow and/or inverse flow models 140/160 may be the same for audio and video; and, in some cases, audio and video may be processed and/or transferred together using the same model. Processing audio and video together may benefit from certain correlations; for example, facial movements corresponding to speech may correlate to audio data representing that speech.

The method 300 may include compressing (350) the first data to generate first compressed data. A compression component such as the compression component 145 described with reference to FIG. 1 may apply one or more compression algorithms to reduce a data size (e.g., in terms of memory space) of the latent representation for more efficient storage and/or transmission. Because the latent distribution has a known variable distribution, the compression may achieve high compression ratios, which may approach theoretical limits. The method 300 may include sending (360) the first compressed data to a second device different from the first device; for example, the second device 110b shown in FIG. 1 and or the device 110 or system 120 shown in FIG. 5.

Figure 4:
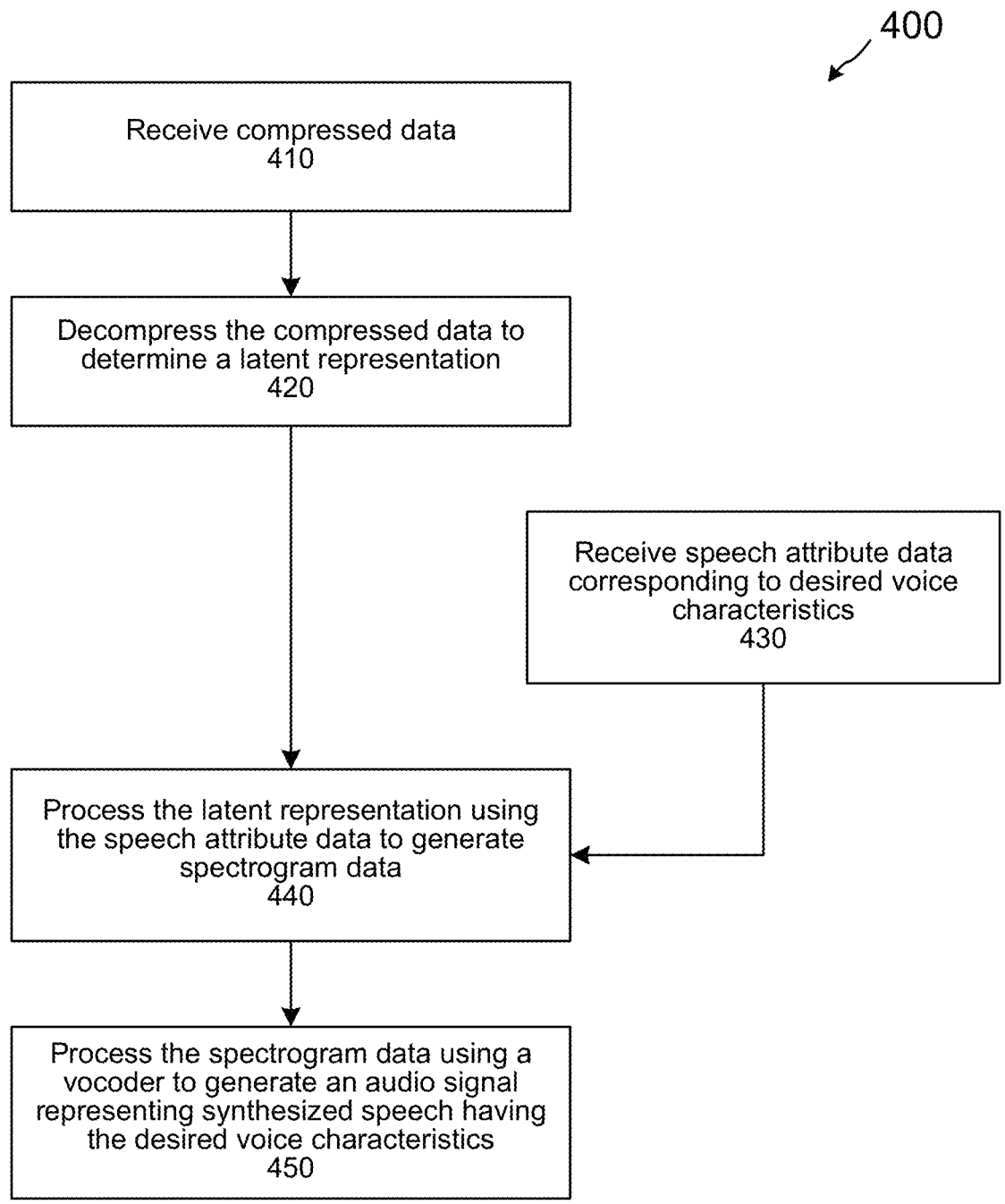
FIG. 4 is a flowchart illustrating an example method of receiving a compressed latent representation, decompressing it, and transforming it to reconstruct speech data, according to embodiments of the present disclosure.

FIG. 4 is a flowchart illustrating an example method 400 of receiving a compressed latent representation, decompressing it, and transforming it to reconstruct speech data, according to embodiments of the present disclosure. The method 400 may be performed by one or more devices 110 of the system 100, for example, a user device such as the second device 110b shown in FIG. 1. The method 400 may include receiving (410) compressed data from, for example, another device such as the first device 110a shown in FIG. 1 and or the device 110 or system 120 shown in FIG. 5. The method 400 may include decompressing (420) the compressed data to determine data representing a latent representation of speech.

The method 400 may include receiving (430) speech attribute data corresponding to desired voice characteristics for synthesized speech. The speech attribute data may be received from the device that sent the compressed data, from a different device, retrieved form a local storage, and/or selected by a user of the device. The method 400 may include processing (440) the data representing the latent representation using a flow model and the speech attribute data to generate spectrogram data. The flow model may be, for example, the inverse flow model 160 described previously with reference to FIGS. 1 and 2. If the speech attribute data used for generating the spectrogram data is the same as the speech attribute data used to generate the latent representation, then the voice characteristics of the resulting speech may be the same as those of the source speech. If the speech attribute data is different, the resulting speech may have different voice characteristics. The speech attribute data may be modified by the sending device (e.g., the device from which the compressed data was received) and/or the receiving device (e.g., the device that received the compressed data). In some implementations, the sending device may modify the speech attribute data in a manner that obscures (e.g., removes or reduces) the presence of identifiable features of the source speech. This may allow a speaker to use the system 100 to anonymize their voice. In some implementations, the sending device and/or the receiving device may modify the speech attribute data to, for example, cause the voice characteristics of the reconstructed speech to bear similarity to that of another person, such as a celebrity. In some implementations, the sending device and/or the receiving device may modify the speech attribute data to adjust particular parameters of the speech; for example, making the speech sound like it from someone older/younger, male/female, etc. In some implementations, the latent representation may additionally include representations of video data. For example, the first device 110a and the second device 110b may engage in a video call using speech and video. Accordingly, the inverse flow model may process the decompressed latent representation to generate both audio data (e.g., spectrogram data) and video data (e.g., a sequence of still images).

The method 400 may include processing (450) the second spectrogram data with a vocoder to generate an audio signal representing synthesized speech having the desired voice characteristics. The vocoder may receive the spectrogram data in the form of, for example, Mel-spectrograms. The vocoder may convert the spectrogram data into an audio signal representing a digitized analog signal (e.g., encoded in a pulse code modulation format). The vocoder (or other downstream component) may convert the audio data to an analog audio signal suitable for amplification and/or output from a loudspeaker. In some implementations, the system 100 may output audio, video, and/or other data by various additional or alternative means. In some cases, the output may be in a different form from what was received. For example, two-dimensional video of a person may be transformed to a three-dimensional representation in a virtual reality environment. In some cases, features of the face may change (e.g., as performed using "filter" apps). In another example, movements determined from video may be processed to actuate an animatronic head/body.

Figure 5:
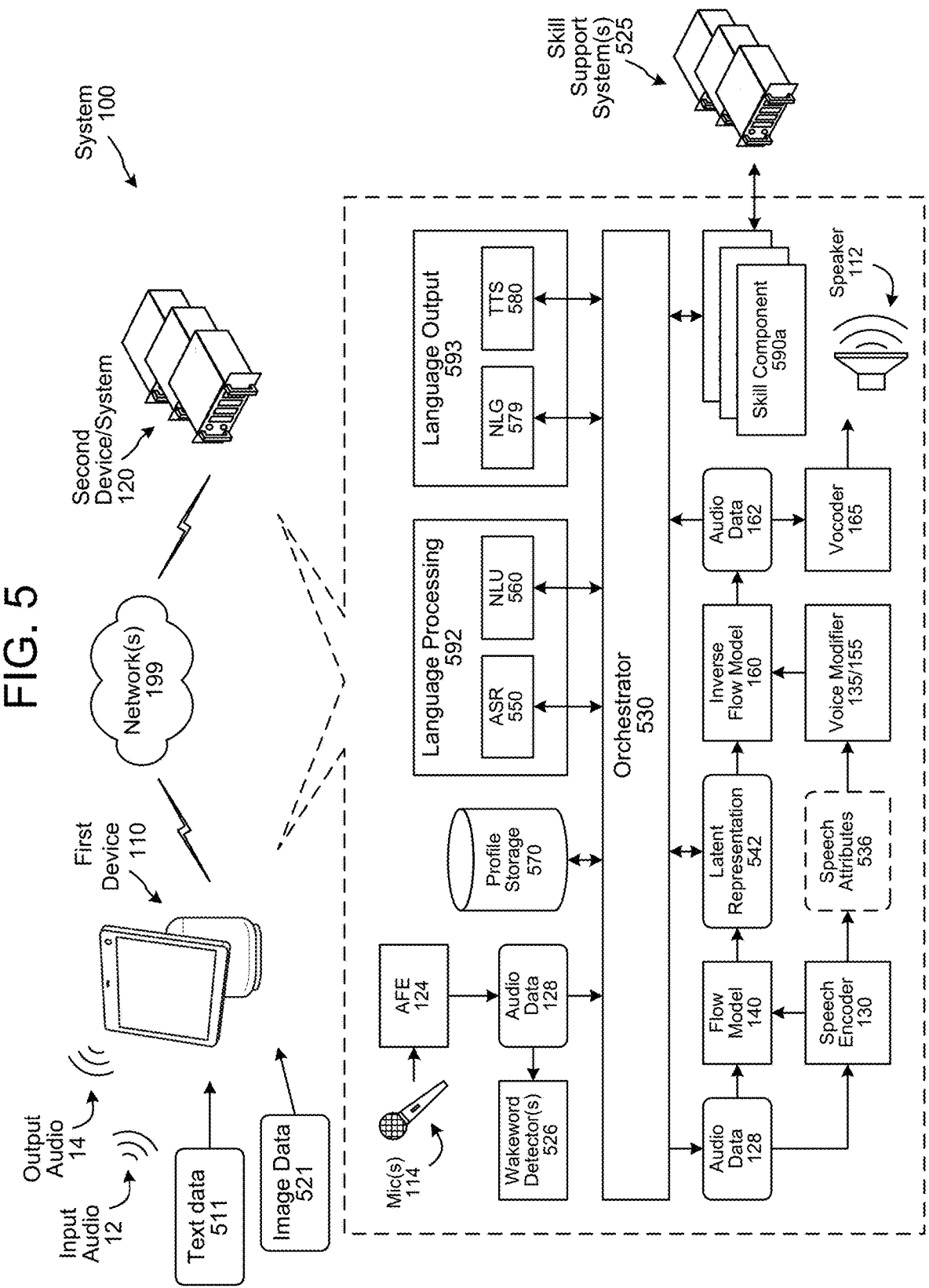
FIG. 5 is a conceptual diagram illustrating additional components of the system, according to embodiments of the present disclosure.

FIG. 5 is a conceptual diagram illustrating additional components of the system 100, according to embodiments of the present disclosure. In some implementations, other speech processing components may be integrated with the system 100 for synthesizing speech for poetry. The speech processing components may include components and/or features for processing natural language, including processing related to ASR, NLU, NLG, and/or TTS. ASR is a field of computer science, artificial intelligence, and linguistics concerned with transforming audio data associated with speech into text representative of that speech. Similarly, NLU is a field of computer science, artificial intelligence, and linguistics concerned with enabling computers to derive meaning from text input containing natural language. ASR and NLU are often used together as part of a speech processing system, sometimes referred to as a spoken language understanding (SLU) system. NLG includes enabling computers to generate output text or other data in words a human can understand, such as sentences or phrases. TTS is a field of computer science concerning transforming textual and/or other data into audio data that is synthesized to resemble human speech.

Figure 10:
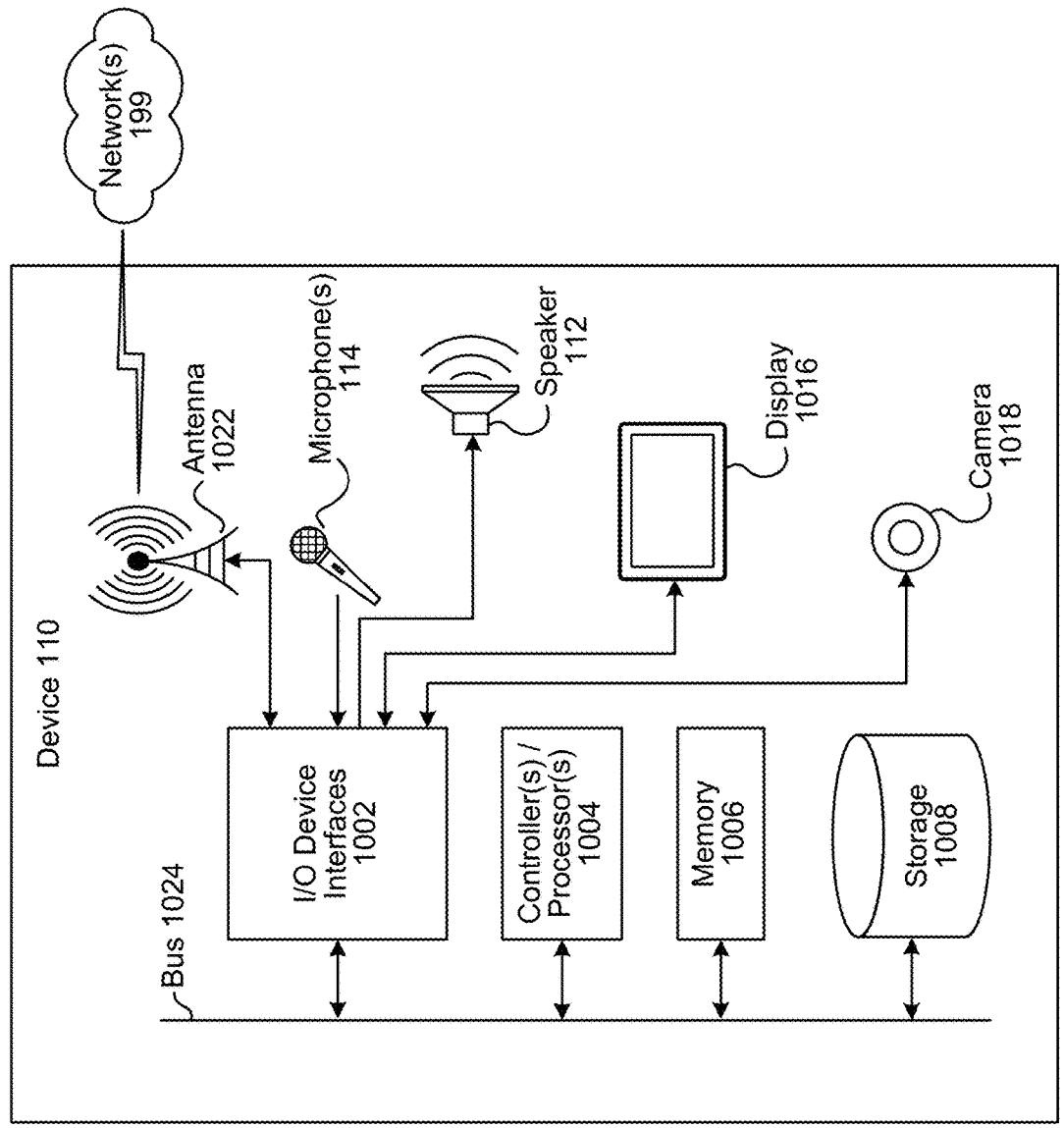
FIG. 10 is a block diagram conceptually illustrating example components of a device, according to embodiments of the present disclosure.
Figure 11:
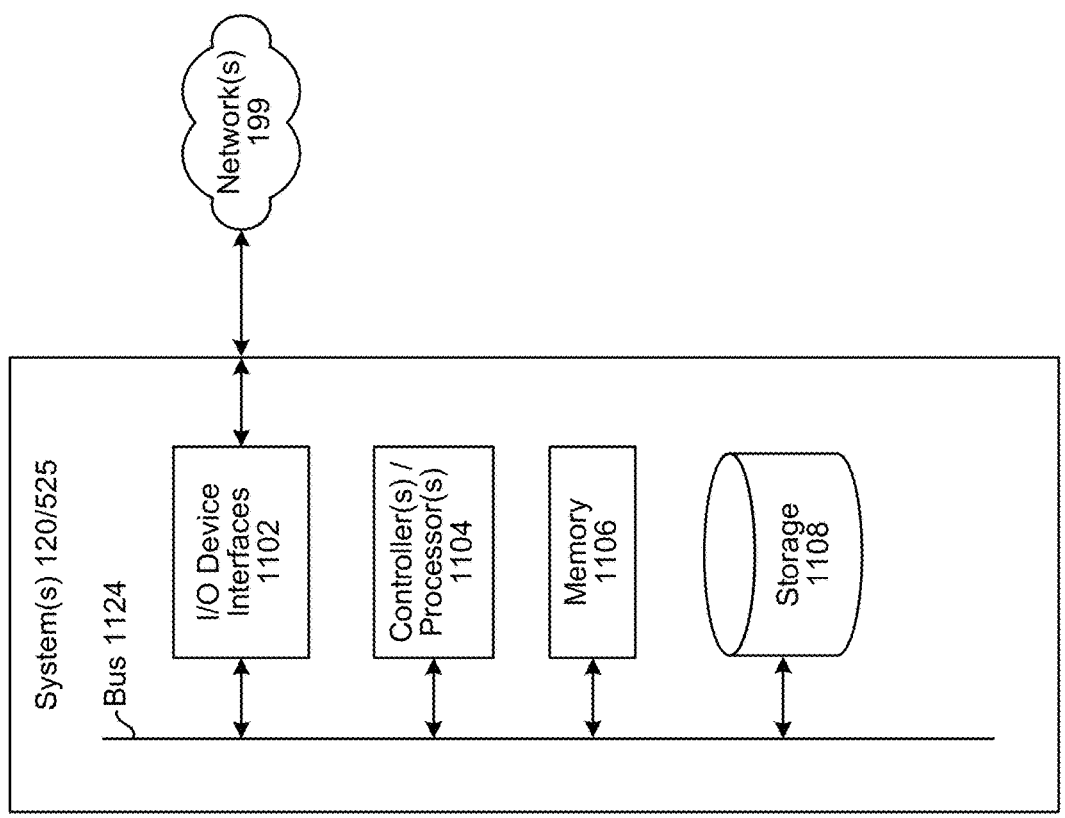
FIG. 11 is a block diagram conceptually illustrating example components of a system, according to embodiments of the present disclosure.
Figure 12:
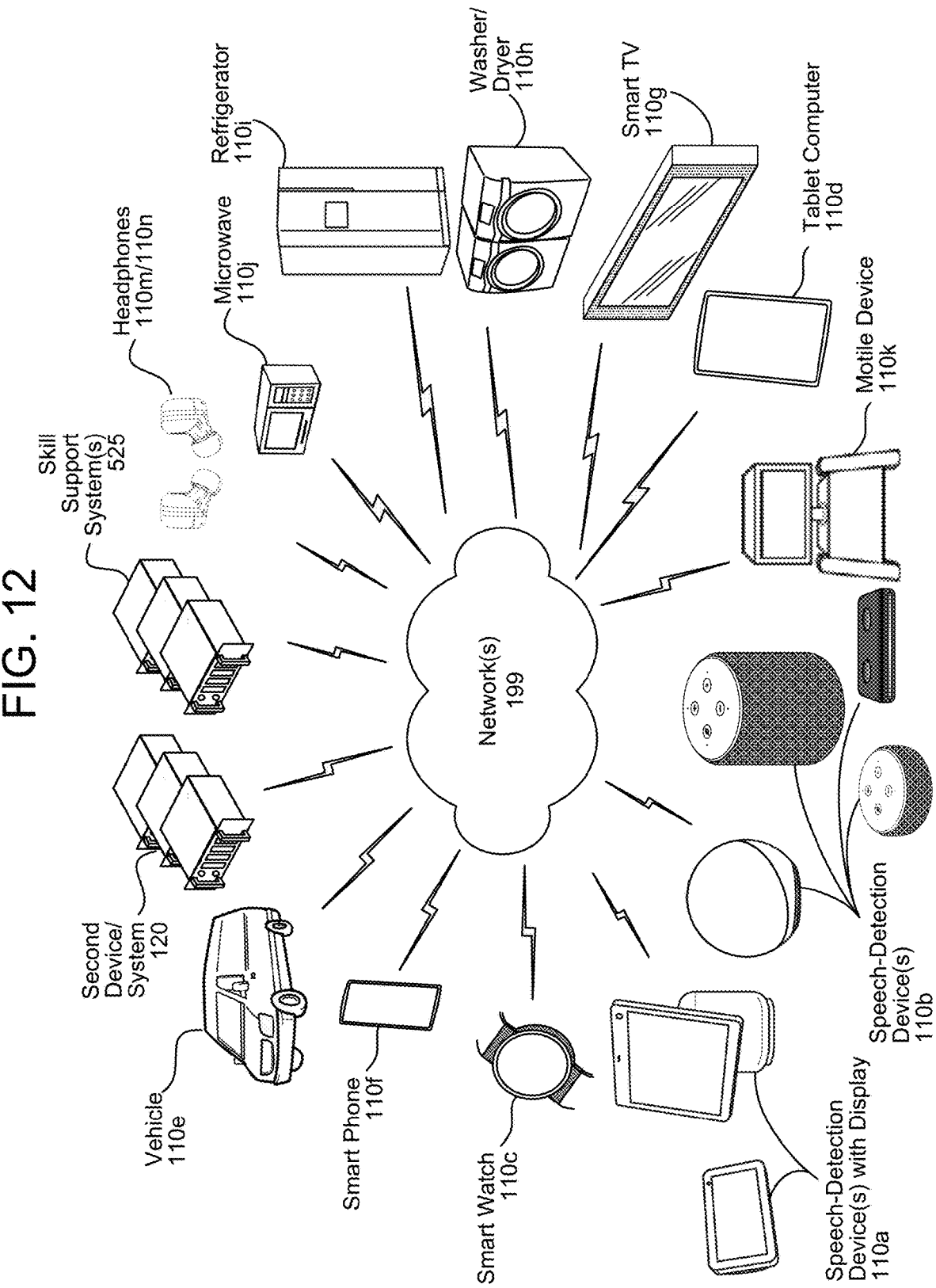
FIG. 12 illustrates an example of a computer network for use with the overall system, according to embodiments of the present disclosure.

The system 100 introduced in FIG. 1 may operate using various additional components shown in FIG. 5. The various components may be located on same or different physical devices; for example, the device 110, a second device/system 120, and/or one or more skill support systems 525. Various components of the system 100 may be divided or duplicated between the first device 110 and one or more second devices/systems 120. FIG. 10 describes certain hardware components of an example device 110. FIG. 11 describes certain hardware components of an example second device/system 120. FIG. 12 illustrates various examples of devices 110, second devices/systems 120, and/or skill support systems 525. Communication between various components may occur directly or across a network(s) 199.

Returning to FIG. 5, the device 110 and/or system 120 may include components for performing source-side and/or receiver-side voice modification. That is, the device 110 may include components for receiving speech audio and modifying voice characteristics before sending data to a second device 110, and the device 110 may include components for receiving data from a second device 110 and reconstructing and/or modifying speech represented therein for output by a loudspeaker 112. For example, the device 110 and/or system 120 may include the speech encoder 130, flow model 140, voice modifier 135/155, and/or inverse flow model 160 as previously discussed.

The speech encoder 130 may receive audio data 128 (e.g., from the orchestrator component 530 and/or an acoustic front end (AFE) 124), and determine speech attributes of speech represented therein. The flow model 140 may receive speech attribute data from the speech encoder 130, and use the speech attribute data to encode the audio data 128 as a latent representation 542. In some implementations, the device 110 may compress the latent representation 542 for storage and/or transmission to a second device 110. In some implementations, the voice modifier 135 may modify the speech attribute data prior to transmission. In some implementations, the speech encoder 130 may generate speech attribute data 536 and send it to a second device 110.

The device 110 may receive a latent representation 542 and/or speech attribute data 536, and reconstruct speech encoded therein. The voice modifier 155 may receive the speech attribute data 536 and modify it prior to providing speech attribute data to the inverse flow model 160 for reconstructing the speech. In some cases, the device 110 may receive no speech attribute data 536 corresponding to the latent representation 542. In such cases, the voice modifier component 155 may provide the inverse flow model 160 with default, alternative, or user-selected speech attributes. The inverse flow model 160 may transform the latent representation back into audio data 162 (e.g., spectrogram data). If the audio data 162 is in spectrogram form, a vocoder 165 of the device 110 may convert the spectrogram data to an audio signal suitable for amplification and output from, for example, a loudspeaker 112.

The device 110 (and/or the second device/system 120) may additionally include audio capture component(s), such as a microphone 114 or array of microphones 114 of a device 110, captures audio 11 and creates corresponding audio data 128. The AFE 124 may process the audio signal using a number of techniques, such as determining frequency-domain audio data by using a transform such as an FFT and/or determining a Mel-cepstrum. The AFE 124 may output audio data 128, which may be or include acoustic feature data corresponding to a representation of the input audio 12. The AFE 124 may process the audio signal to create acoustic feature data, which may include one or more acoustic-feature vectors such as LFBE vectors. Other types of feature vectors may be similarly created and used; for example, the feature vectors may include Mel-frequency cepstrum coefficients (MFCCs).

The AFE 124 may include an analysis filterbank that processes one or more frames audio data (and/or other sequential input data). The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

Once speech is detected in audio data 128 representing the audio 11, the device 110 may determine if the speech is directed at the device 110/system 120. In at least some embodiments, such determination may be made using a wakeword detection component 526. The wakeword detection component 526 may be configured to detect various wakewords. In at least some examples, each wakeword may correspond to a name of a different digital assistant. An example wakeword/digital assistant name is "Alexa." In another example, input to the system may be in form of text data 511, for example as a result of a user typing an input into a user interface of device 110. Other input forms may include indication that the user has pressed a physical or virtual button on device 110, the user has made a gesture, etc. The device 110 may also capture images using camera(s) 1018 of the device 110 and may generate image data 521 representing those image(s). The image data 521 may include raw image data or image data processed by the device 110 and/or the system 120. The image data 521 may be used in various manners by different components of the system 100 to perform operations such as determining whether a user is directing an utterance to the system, interpreting a user command, responding to a user command, etc.

The wakeword detection component 526 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 526 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 526 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 526 and/or input is detected by an input detector, the device 110 may "wake" and begin generating audio data 128 representing the audio 11. The audio data 128 may include data corresponding to the wakeword; in other embodiments, the portion of the audio corresponding to the wakeword is removed by the device 110 prior to sending the audio data 128 to downstream components of the system 100. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 526 may result in sending audio data to a first system 120 for processing while detection of the wakeword "Computer" by the wakeword detector may result in sending audio data to a second system for processing. The system may have a separate wakeword and system for different skills/systems (e.g., "Dungeon Master" for a game play skill/system 120) and/or such skills/systems may be coordinated by one or more skill component(s) 590 of one or more systems 120.

Upon receipt by the system 100, the audio data 128 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 128 to a language processing component 592. The language processing component 592 (sometimes also referred to as a spoken language understanding (SLU) component) includes an automatic speech recognition (ASR) component 150 and a natural language understanding (NLU) component 160. The ASR component 550 may transcribe the audio data 128 into ASR data (e.g., text data). The text data output by the ASR component 550 represents one or more than one (e.g., in the form of an N-best list) ASR hypotheses representing speech represented in the audio data 128. The ASR component 550 interprets the speech in the audio data 128 based on a similarity between the audio data 128 and pre-established language models. For example, the ASR component 550 may compare the audio data 128 with models for sounds (e.g., acoustic units such as phonemes, senons, phones, etc.) and sequences of sounds to identify words that match the sequence of sounds of the speech represented in the audio data 128. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in greater detail below with regard to FIG. 6.

The language processing components 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the system(s) 120, a skill component 590, a skill support system(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 5. However, if the NLU component 560 is unable to resolve the entity—for example, because the entity is referred to by anaphora such as "this song" or "my next appointment"—the language processing components 592 can send a decode request to other language processing components 592 for information regarding the entity mention and/or other context related to the utterance. The language processing components 592 may augment, correct, or base results data upon the audio data 128 as well as any data received from the other language processing components 592.

The NLU component 560 may return NLU results data 885/825 (which may include tagged text data, indicators of intent, etc.) back to the orchestrator component 530. The orchestrator component 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 885/825 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 895 which may incorporate other information to rank potential interpretations determined by the NLU component 560. The local device 110 may also include its own post-NLU ranker 895, which may operate similarly to the post-NLU ranker 895. The NLU component 560, post-NLU ranker 895 and other components are described in greater detail below with regard to FIGS. 7 and 8.

A skill component may be software running on the device 110 and/or system(s) 120 that is akin to a software application. That is, a skill component 590 may enable the device 110 and/or system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The device 110 and/or system(s) 120 may be configured with more than one skill component 590. For example, a weather service skill component may enable the device 110 and/or system(s) 120 to provide weather information, a car service skill component may enable the device 110 and/or system(s) 120 to book a trip with respect to a taxi or ride sharing service, a restaurant skill component may enable the device 110 and/or system(s) 120 to order a pizza with respect to the restaurant's online ordering system, etc. A skill component 590 may operate in conjunction with the device 110 and/or system(s) 120 in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system(s) 525 may communicate with a skill component(s) 590 within the device 110 and/or system(s) 120 and/or directly with the orchestrator component 530 or with other components. A skill support system(s) 525 may be configured to perform one or more actions. An ability to perform such action(s) may sometimes be referred to as a "skill." That is, a skill may enable a skill support system(s) 525 to execute specific functionality in order to provide data or perform some other action requested by a user. For example, a weather service skill may enable a skill support system(s) 525 to provide weather information to the device 110 and/or system(s) 120, a car service skill may enable a skill support system(s) 525 to book a trip with respect to a taxi or ride sharing service, an order pizza skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The device 110 and/or system(s) 120 may be configured with a skill component 590 dedicated to interacting with the skill support system(s) 525. Unless expressly stated otherwise, reference to a skill, skill device, or skill component may include a skill component 590 operated by the device 110 and/or system(s) 120 and/or skill operated by the skill support system(s) 525. Moreover, the functionality described herein as a skill or skill may be referred to using many different terms, such as an action, bot, app, or the like. The skill component 590 and or skill support system(s) 525 may return output data to the orchestrator component 530.

The system 100 includes a language output component 593. The language output component 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data 511 discussed below). Alternatively or in addition, the TTS component 580 may receive text data from a skill component 590 or other system component for output.

The NLG component 579 may include a trained model. The NLG component 579 generates text data 511 from dialog data received by, for example, a dialog manager such that the output text data 511 has a natural feel and, in some embodiments, includes words and/or phrases specifically formatted for a requesting individual. The NLG may use templates to formulate responses. And/or the NLG system may include models trained from the various templates for forming the output text data 511. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 580.

The TTS component 580 may generate audio data (e.g., synthesized speech) from word data and/or text data, which may represent natural language content, using one or more different methods. Text data 511 input to the TTS component 580 may come from a skill component 590, the orchestrator component 530, or another component of the system. The TTS component 580 may generate synthesized speech by various methods. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. The TTS component 580 may employ one or more machine learning models to generate synthesized speech; for example, the voice modifier component 155 and/or the flow model 160 previously described. In some implementations, parametric synthesis and/or model-based speech synthesis may involve generating audio data in the form of spectrogram data such as Mel-spectrograms. The TTS component 580 may include computerized voice generator, sometimes called a vocoder, for converting the spectrogram data to an audio signal suitable for amplification and output from, for example, a loudspeaker 112 as shown in FIG. 10. The TTS component 580, including unit-based and model-based TTS operation, is described in additional detail below with reference to FIG. 9.

The system 100 may include computerized voice generator, sometimes called a vocoder 165, for converting the spectrogram data to an audio signal suitable for amplification and output from, for example, a loudspeaker 112.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the device 110 and/or system 120 with permission to allow the skill to execute with respect to the user's natural language user inputs. If a user does not enable a skill, the device 110 and/or system 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 6:
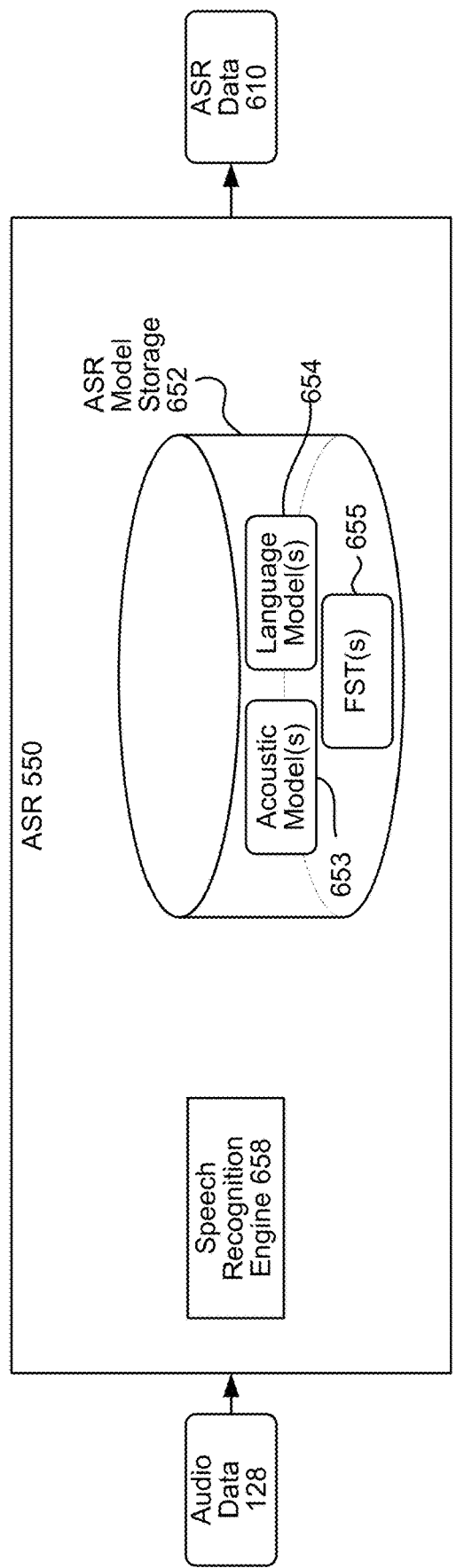
FIG. 6 is a conceptual diagram of an ASR component, according to embodiments of the present disclosure.

FIG. 6 is a conceptual diagram of an ASR component 550, according to embodiments of the present disclosure. The ASR component 550 may interpret a spoken natural language input based on the similarity between the spoken natural language input and pre-established language models 654 stored in an ASR model storage 652. For example, the ASR component 550 may compare the audio data with models for sounds (e.g., subword units or phonemes) and sequences of sounds to identify words that match the sequence of sounds spoken in the natural language input. Alternatively, the ASR component 550 may use a finite state transducer (FST) 655 to implement the language model functions.

When the ASR component 550 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may include a speech recognition engine 658. The ASR component 550 receives audio data 128 (for example, received from a local device 110 having processed audio detected by a microphone 114 by an acoustic front end (AFE) 124 or other component). The speech recognition engine 658 compares the audio data 128 with acoustic models 653, language models 654, FST(s) 655, and/or other data models and information for recognizing the speech conveyed in the audio data. The audio data 128 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as Mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 658 may process the audio data 128 with reference to information stored in the ASR model storage 652. Feature vectors of the audio data 128 may arrive at the system 120 encoded, in which case they may be decoded prior to processing by the speech recognition engine 658.

The speech recognition engine 658 attempts to match received feature vectors to language acoustic units (e.g., phonemes) and words as known in the stored acoustic models 653, language models 654, and FST(s) 655. For example, audio data 128 may be processed by one or more acoustic model(s) 653 to determine acoustic unit data. The acoustic unit data may include indicators of acoustic units detected in the audio data 128 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR output data 610. The ASR output data 610 can include one or more hypotheses. One or more of the hypotheses represented in the ASR output data 610 may then be sent to further components (such as the NLU component 560) for further processing as discussed herein. The ASR output data 610 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7:
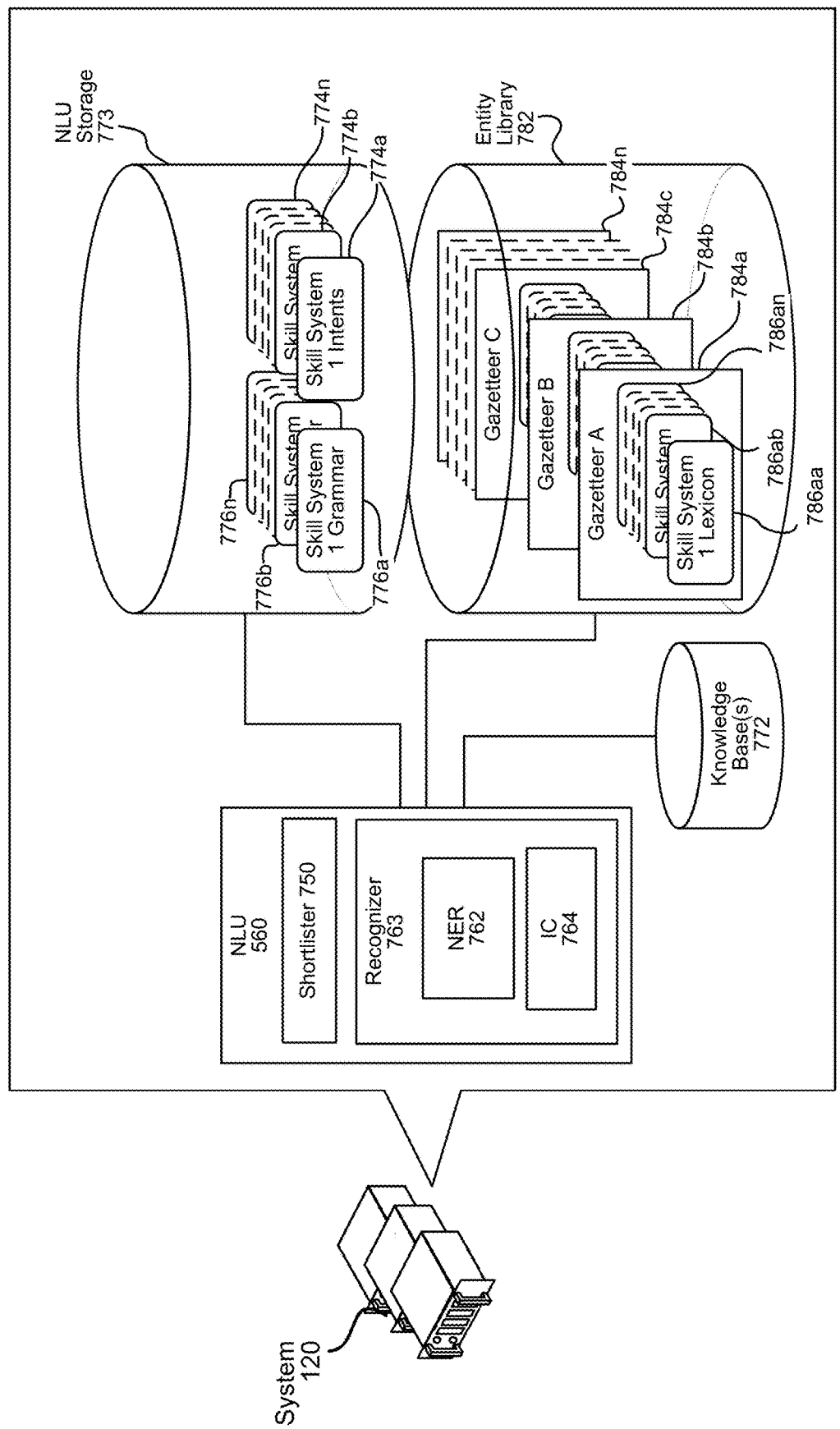
FIG. 7 is a conceptual diagram of how natural language processing is performed, according to embodiments of the present disclosure.
Figure 8:
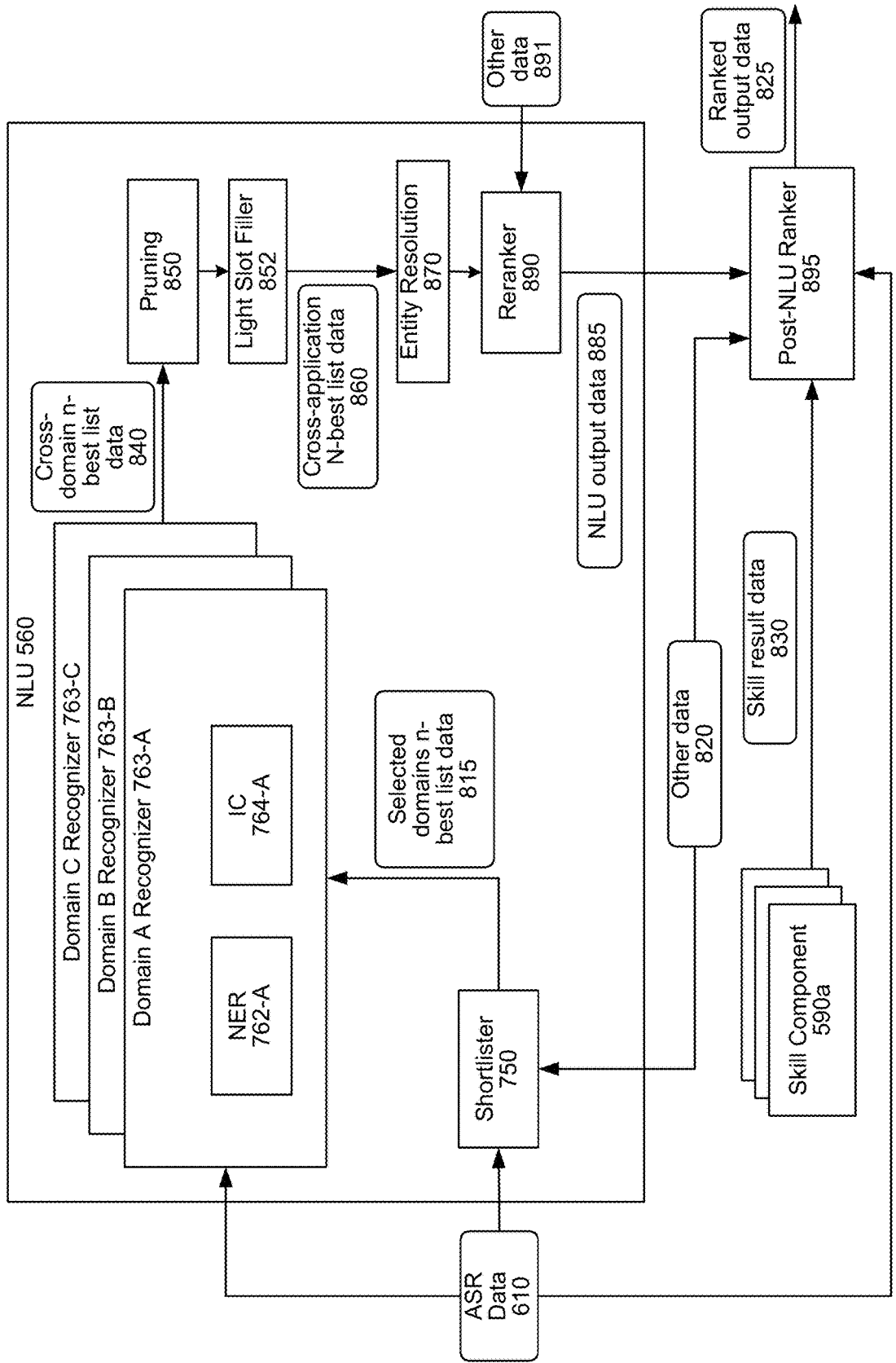
FIG. 8 is a conceptual diagram of how natural language processing is performed, according to embodiments of the present disclosure.

FIGS. 7 and 8 illustrates how the NLU component 560 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 750. The shortlister component 750 selects skills that may execute with respect to ASR output data 610 input to the NLU component 560 (e.g., applications that may execute with respect to the user input). The ASR output data 610 (which may also be referred to as ASR output data 610) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 560 may process ASR output data 610 input thereto with respect to every skill of the system, either in parallel, in series, or using some combination thereof. By implementing a shortlister component 750, the NLU component 560 may process ASR output data 610 with respect to only the skills that may execute with respect to the user input. This reduces total compute power and latency attributed to NLU processing.

The shortlister component 750 may include one or more trained models. The model(s) may be trained to recognize various forms of user inputs that may be received by the device 110 and/or system(s) 120. For example, during a training period skill support system(s) 525 associated with a skill may provide the system(s) 120 with training text data representing sample user inputs that may be provided by a user to invoke the skill. For example, for a ride sharing skill, a skill support system(s) 525 associated with the ride sharing skill may provide the system(s) 120 with training text data including text corresponding to "get me a cab to [location],", "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system(s) 120 may solicit the skill support system(s) 525 associated with the skill regarding whether the determined other user input structures are permissible, from the perspective of the skill support system(s) 525, to be used to invoke the skill. The alternate user input structures may be derived by one or more trained models during model training and/or may be based on user input structures provided by different skills. The skill support system(s) 525 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system(s) 120 may use the sample user inputs provided by a skill support system(s) 525, and related sample user inputs potentially determined during training, as binary examples to train a model associated with a skill associated with the skill support system(s) 525. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 610 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 560 may include one or more recognizers 763. In at least some embodiments, a recognizer 763 may be associated with a skill support system 525 (e.g., the recognizer may be configured to interpret text data to correspond to the skill support system 525). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 610 is potentially associated with multiple domains, the recognizers 763 associated with the domains may process the ASR output data 610, while recognizers 763 not indicated in the shortlister component 750's output may not process the ASR output data 610. The "shortlisted" recognizers 763 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 560) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776, a particular set of intents/actions 774, and a particular personalized lexicon 786. The grammar databases 776, and intents/actions 774 may be stored in an NLU storage 773. Each gazetteer 784 may include domain/skill-indexed lexical information associated with a particular user and/or device 110. For example, a Gazetteer A (784a) includes skill-indexed lexical information 786aa to 786an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (784a-784n) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent} <PlayMusic>, {artist name} rolling stones, {media type} SONG, and {song title} mother's little helper. For further example, the NER component 762 may tag "play songs by the rolling stones" as: {domain} Music, {intent} <PlayMusic>, {artist name} rolling stones, and {media type} SONG.

The shortlister component 750 may receive ASR output data 610 output from the ASR component 550 or output from the device 110b (as illustrated in FIG. 8). The ASR component 550 may embed the ASR output data 610 into a form processable by a trained model(s) using sentence embedding techniques as known in the art. Sentence embedding results in the ASR output data 610 including text in a structure that enables the trained models of the shortlister component 750 to operate on the ASR output data 610. For example, an embedding of the ASR output data 610 may be a vector representation of the ASR output data 610.

The shortlister component 750 may make binary determinations (e.g., yes or no) regarding which domains relate to the ASR output data 610. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 610. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 610. In another example, instead of indicating every domain of the system, the n-best list data 815 may only indicate the domains that are likely to be able to execute the user input represented in the ASR output data 610. In yet another example, the shortlister component 750 may implement thresholding such that the n-best list data 815 may indicate no more than a maximum number of domains that may execute the user input represented in the ASR output data 610. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 610 by the shortlister component 750 relative to such domains) are included in the n-best list data 815.

The ASR output data 610 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 610.

As indicated above, the shortlister component 750 may implement thresholding such that an n-best list output therefrom may include no more than a threshold number of entries. If the ASR output data 610 includes more than one ASR hypothesis, the n-best list output by the shortlister component 750 may include no more than a threshold number of entries irrespective of the number of ASR hypotheses output by the ASR component 550. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 750 may generate confidence scores representing likelihoods that domains relate to the ASR output data 610. If the shortlister component 750 implements a different trained model for each domain, the shortlister component 750 may generate a different confidence score for each individual domain trained model that is run. If the shortlister component 750 runs the models of every domain when ASR output data 610 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 610.

N-best list data 815 including confidence scores that may be output by the shortlister component 750 may be represented as, for example:
  Search domain, 0.67
  Recipe domain, 0.62
  Information domain, 0.57
  Shopping domain, 0.42

As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 610 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 610, for example as determined by a user recognition component.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 750 receives the ASR output data 610, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 610. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 610 (e.g., the shortlister component 750 determines a confidence score of zero for the domain).

The shortlister component 750 may send the ASR output data 610 to recognizers 763 associated with domains represented in the n-best list data 815. Alternatively, the shortlister component 750 may send the n-best list data 815 or some other indicator of the selected subset of domains to another component (such as the orchestrator component 530) which may in turn send the ASR output data 610 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 530 may send the ASR output data 610 to recognizers 763 associated with domains that the shortlister component 750 determines may execute the user input. If the shortlister component 750 generates an n-best list representing domains with associated confidence scores, the shortlister component 750/orchestrator component 530 may send the ASR output data 610 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 560 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 560 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 560 may include multiple entity resolution components 870 and each entity resolution component 870 may be specific to one or more domains.

The NLU component 560 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system(s) 120 (e.g., designated 590 in FIG. 1). The NLU component 560 may separately perform NLU processing described above with respect to domains associated with skills that are at least partially implemented as part of the skill support system(s) 525. In an example, the shortlister component 750 may only process with respect to these latter domains. Results of these two NLU processing paths may be merged into NLU output data 885, which may be sent to a post-NLU ranker 895, which may be implemented by the system(s) 120.

The post-NLU ranker 895 may include a statistical component that produces a ranked list of intent/skill pairs with associated confidence scores. Each confidence score may indicate an adequacy of the skill's execution of the intent with respect to NLU results data associated with the skill. The post-NLU ranker 895 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 895. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 895 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 895 (or other scheduling component such as orchestrator component 530) may solicit the first skill and the second skill to provide potential result data 830 based on the first NLU hypothesis and the second NLU hypothesis, respectively. For example, the post-NLU ranker 895 may send the first NLU hypothesis to the first skill component 590a along with a request for the first skill component 590a to at least partially execute with respect to the first NLU hypothesis. The post-NLU ranker 895 may also send the second NLU hypothesis to the second skill component 590b along with a request for the second skill component 590b to at least partially execute with respect to the second NLU hypothesis. The post-NLU ranker 895 receives, from the first skill component 590a, first result data 830a generated from the first skill component 590a's execution with respect to the first NLU hypothesis. The post-NLU ranker 895 also receives, from the second skill component 590b, second results data 830b generated from the second skill component 590b's execution with respect to the second NLU hypothesis.

The result data 830 may include various portions. For example, the result data 830 may include content (e.g., audio data, text data, and/or video data) to be output to a user. The result data 830 may also include a unique identifier used by the system(s) 120 and/or the skill support system(s) 525 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 895 may consider the first result data 830a and the second result data 830b to alter the first confidence score and the second confidence score of the first NLU hypothesis and the second NLU hypothesis, respectively. That is, the post-NLU ranker 895 may generate a third confidence score based on the first result data 830a and the first confidence score. The third confidence score may correspond to how likely the post-NLU ranker 895 determines the first skill will correctly respond to the user input. The post-NLU ranker 895 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 895 may also consider the other data 820 to generate the third confidence score and the fourth confidence score. While it has been described that the post-NLU ranker 895 may alter the confidence scores associated with first and second NLU hypotheses, one skilled in the art will appreciate that the post-NLU ranker 895 may alter the confidence scores of more than two NLU hypotheses. The post-NLU ranker 895 may select the result data 830 associated with the skill component 590 with the highest altered confidence score to be the data output in response to the current user input. The post-NLU ranker 895 may also consider the ASR output data 610 to alter the NLU hypotheses confidence scores.

The orchestrator component 530 may, prior to sending the NLU results data 885 to the post-NLU ranker 895, associate intents in the NLU hypotheses with skill components 590. For example, if a NLU hypothesis includes a <PlayMusic> intent, the orchestrator component 530 may associate the NLU hypothesis with one or more skill components 590 that can execute the <PlayMusic> intent. Thus, the orchestrator component 530 may send the NLU results data 885, including NLU hypotheses paired with skill components 590, to the post-NLU ranker 895. In response to ASR output data 610 corresponding to "what should I do for dinner today," the orchestrator component 530 may generates pairs of skill components 590 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 895 queries each skill component 590, paired with a NLU hypothesis in the NLU output data 885, to provide result data 830 based on the NLU hypothesis with which it is associated. That is, with respect to each skill, the post-NLU ranker 895 colloquially asks the each skill "if given this NLU hypothesis, what would you do with it." According to the above example, the post-NLU ranker 895 may send skill components 590 the following data:

Skill 1: First NLU hypothesis including <Help> intent indicator
Skill 2: Second NLU hypothesis including <Order> intent indicator Skill 3: Third NLU hypothesis including <DishType> intent indicator The post-NLU ranker 895 may query each of the skill components 590 in parallel or substantially in parallel.

A skill component 590 may provide the post-NLU ranker 895 with various data and indications in response to the post-NLU ranker 895 soliciting the skill component 590 for result data 830. A skill component 590 may simply provide the post-NLU ranker 895 with an indication of whether or not the skill can execute with respect to the NLU hypothesis it received. A skill component 590 may also or alternatively provide the post-NLU ranker 895 with output data generated based on the NLU hypothesis it received. In some situations, a skill component 590 may need further information in addition to what is represented in the received NLU hypothesis to provide output data responsive to the user input. In these situations, the skill component 590 may provide the post-NLU ranker 895 with result data 830 indicating slots of a framework that the skill component 590 further needs filled or entities that the skill component 590 further needs resolved prior to the skill component 590 being able to provided result data 830 responsive to the user input. The skill component 590 may also provide the post-NLU ranker 895 with an instruction and/or computer-generated speech indicating how the skill component 590 recommends the system solicit further information needed by the skill component 590. The skill component 590 may further provide the post-NLU ranker 895 with an indication of whether the skill component 590 will have all needed information after the user provides additional information a single time, or whether the skill component 590 will need the user to provide various kinds of additional information prior to the skill component 590 having all needed information. According to the above example, skill components 590 may provide the post-NLU ranker 895 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 830 includes an indication provided by a skill component 590 indicating whether or not the skill component 590 can execute with respect to a NLU hypothesis; data generated by a skill component 590 based on a NLU hypothesis; as well as an indication provided by a skill component 590 indicating the skill component 590 needs further information in addition to what is represented in the received NLU hypothesis.

The post-NLU ranker 895 uses the result data 830 provided by the skill components 590 to alter the NLU processing confidence scores generated by the reranker 890. That is, the post-NLU ranker 895 uses the result data 830 provided by the queried skill components 590 to create larger differences between the NLU processing confidence scores generated by the reranker 890. Without the post-NLU ranker 895, the system may not be confident enough to determine an output in response to a user input, for example when the NLU hypotheses associated with multiple skills are too close for the system to confidently determine a single skill component 590 to invoke to respond to the user input. For example, if the system does not implement the post-NLU ranker 895, the system may not be able to determine whether to obtain output data from a general reference information skill or a medical information skill in response to a user input corresponding to "what is acne."

The post-NLU ranker 895 may prefer skill components 590 that provide result data 830 responsive to NLU hypotheses over skill components 590 that provide result data 830 corresponding to an indication that further information is needed, as well as skill components 590 that provide result data 830 indicating they can provide multiple responses to received NLU hypotheses. For example, the post-NLU ranker 895 may generate a first score for a first skill component 590a that is greater than the first skill's NLU confidence score based on the first skill component 590a providing result data 830a including a response to a NLU hypothesis. For further example, the post-NLU ranker 895 may generate a second score for a second skill component 590b that is less than the second skill's NLU confidence score based on the second skill component 590b providing result data 830b indicating further information is needed for the second skill component 590b to provide a response to a NLU hypothesis. Yet further, for example, the post-NLU ranker 895 may generate a third score for a third skill component 590c that is less than the third skill's NLU confidence score based on the third skill component 590c providing result data 830c indicating the third skill component 590c can provide multiple responses to a NLU hypothesis.

The post-NLU ranker 895 may consider other data 820 in determining scores. The other data 820 may include rankings associated with the queried skill components 590. A ranking may be a system ranking or a user-specific ranking. A ranking may indicate a veracity of a skill from the perspective of one or more users of the system. For example, the post-NLU ranker 895 may generate a first score for a first skill component 590a that is greater than the first skill's NLU processing confidence score based on the first skill component 590a being associated with a high ranking. For further example, the post-NLU ranker 895 may generate a second score for a second skill component 590b that is less than the second skill's NLU processing confidence score based on the second skill component 590b being associated with a low ranking.

The other data 820 may include information indicating whether or not the user that originated the user input has enabled one or more of the queried skill components 590. For example, the post-NLU ranker 895 may generate a first score for a first skill component 590a that is greater than the first skill's NLU processing confidence score based on the first skill component 590a being enabled by the user that originated the user input. For further example, the post-NLU ranker 895 may generate a second score for a second skill component 590b that is less than the second skill's NLU processing confidence score based on the second skill component 590b not being enabled by the user that originated the user input. When the post-NLU ranker 895 receives the NLU results data 885, the post-NLU ranker 895 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 895 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 895 may increase the NLU processing confidence score associated with a first skill configured to output visual data and/or decrease the NLU processing confidence score associated with a second skill configured to output audio data.

The other data 820 may include information indicating the veracity of the result data 830 provided by a skill component 590. For example, if a user says "tell me a recipe for pasta sauce," a first skill component 590*a* may provide the post-NLU ranker 895 with first result data 830*a* corresponding to a first recipe associated with a five star rating and a second skill component 590*b* may provide the post-NLU ranker 895 with second result data 830*b* corresponding to a second recipe associated with a one star rating. In this situation, the post-NLU ranker 895 may increase the NLU processing confidence score associated with the first skill component 590*a* based on the first skill component 590*a* providing the first result data 830*a* associated with the five star rating and/or decrease the NLU processing confidence score associated with the second skill component 590*b* based on the second skill component 590*b* providing the second result data 830*b* associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 895 may increase the NLU processing confidence score associated with a first skill component 590*a* corresponding to a room service skill associated with the hotel and/or decrease the NLU processing confidence score associated with a second skill component 590*b* corresponding to a food skill not associated with the hotel.

The other data 820 may include information indicating a location of the device and/or user that originated the user input. The system may be configured with skill components 590 that may only operate with respect to certain geographic locations. For example, a user may provide a user input corresponding to "when is the next train to Portland." A first skill component 590*a* may operate with respect to trains that arrive at, depart from, and pass through Portland, Oregon. A second skill component 590*b* may operate with respect to trains that arrive at, depart from, and pass through Portland, Maine. If the device and/or user that originated the user input is located in Seattle, Washington, the post-NLU ranker 895 may increase the NLU processing confidence score associated with the first skill component 590*a* and/or decrease the NLU processing confidence score associated with the second skill component 590*b*. Likewise, if the device and/or user that originated the user input is located in Boston, Massachusetts, the post-NLU ranker 895 may increase the NLU processing confidence score associated with the second skill component 590*b* and/or decrease the NLU processing confidence score associated with the first skill component 590*a*.

The other data 820 may include information indicating a time of day. The system may be configured with skill components 590 that operate with respect to certain times of day. For example, a user may provide a user input corresponding to "order me food." A first skill component 590*a* may generate first result data 830*a* corresponding to breakfast. A second skill component 590*b* may generate second result data 830*b* corresponding to dinner. If the system(s) 120 receives the user input in the morning, the post-NLU ranker 895 may increase the NLU processing confidence score associated with the first skill component 590*a* and/or decrease the NLU processing score associated with the second skill component 590*b*. If the system(s) 120 receives the user input in the afternoon or evening, the post-NLU ranker 895 may increase the NLU processing confidence score associated with the second skill component 590*b* and/or decrease the NLU processing confidence score associated with the first skill component 590*a*.

The other data 820 may include information indicating user preferences. The system may include multiple skill components 590 configured to execute in substantially the same manner. For example, a first skill component 590*a* and a second skill component 590*b* may both be configured to order food from respective restaurants. The system may store a user preference (e.g., in the profile storage 570) that is associated with the user that provided the user input to the system(s) 120 as well as indicates the user prefers the first skill component 590*a* over the second skill component 590*b*. Thus, when the user provides a user input that may be executed by both the first skill component 590*a* and the second skill component 590*b*, the post-NLU ranker 895 may increase the NLU processing confidence score associated with the first skill component 590*a* and/or decrease the NLU processing confidence score associated with the second skill component 590*b*.

The other data 820 may include information indicating system usage history associated with the user that originated the user input. For example, the system usage history may indicate the user originates user inputs that invoke a first skill component 590*a* more often than the user originates user inputs that invoke a second skill component 590*b*. Based on this, if the present user input may be executed by both the first skill component 590*a* and the second skill component 590*b*, the post-NLU ranker 895 may increase the NLU processing confidence score associated with the first skill component 590*a* and/or decrease the NLU processing confidence score associated with the second skill component 590*b*.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 895 may increase the NLU processing confidence score associated with a first skill component 590*a* that generates audio data. The post-NLU ranker 895 may also or alternatively decrease the NLU processing confidence score associated with a second skill component 590*b* that generates image data or video data.

The other data 820 may include information indicating how long it took a skill component 590 to provide result data 830 to the post-NLU ranker 895. When the post-NLU ranker 895 multiple skill components 590 for result data 830, the skill components 590 may respond to the queries at different speeds. The post-NLU ranker 895 may implement a latency budget. For example, if the post-NLU ranker 895 determines a skill component 590 responds to the post-NLU ranker 895 within a threshold amount of time from receiving a query from the post-NLU ranker 895, the post-NLU ranker 895 may increase the NLU processing confidence score associated with the skill component 590. Conversely, if the post-NLU ranker 895 determines a skill component 590 does not respond to the post-NLU ranker 895 within a threshold amount of time from receiving a query from the post-NLU ranker 895, the post-NLU ranker 895 may decrease the NLU processing confidence score associated with the skill component 590.

It has been described that the post-NLU ranker 895 uses the other data 820 to increase and decrease NLU processing confidence scores associated with various skill components 590 that the post-NLU ranker 895 has already requested result data from. Alternatively, the post-NLU ranker 895 may use the other data 820 to determine which skill components 590 to request result data from. For example, the post-NLU ranker 895 may use the other data 820 to increase and/or decrease NLU processing confidence scores associated with skill components 590 associated with the NLU results data 885 output by the NLU component 560. The post-NLU ranker 895 may select n-number of top scoring altered NLU processing confidence scores. The post-NLU ranker 895 may then request result data 830 from only the skill components 590 associated with the selected n-number of NLU processing confidence scores.

As described, the post-NLU ranker 895 may request result data 830 from all skill components 590 associated with the NLU results data 885 output by the NLU component 560. Alternatively, the system(s) 120 may prefer result data 830 from skills implemented entirely by the system(s) 120 rather than skills at least partially implemented by the skill support system(s) 525. Therefore, in the first instance, the post-NLU ranker 895 may request result data 830 from only skills associated with the NLU results data 885 and entirely implemented by the system(s) 120. The post-NLU ranker 895 may only request result data 830 from skills associated with the NLU results data 885, and at least partially implemented by the skill support system(s) 525, if none of the skills, wholly implemented by the system(s) 120, provide the post-NLU ranker 895 with result data 830 indicating either data response to the NLU results data 885, an indication that the skill can execute the user input, or an indication that further information is needed.

As indicated above, the post-NLU ranker 895 may request result data 830 from multiple skill components 590. If one of the skill components 590 provides result data 830 indicating a response to a NLU hypothesis and the other skills provide result data 830 indicating either they cannot execute or they need further information, the post-NLU ranker 895 may select the result data 830 including the response to the NLU hypothesis as the data to be output to the user. If more than one of the skill components 590 provides result data 830 indicating responses to NLU hypotheses, the post-NLU ranker 895 may consider the other data 820 to generate altered NLU processing confidence scores, and select the result data 830 of the skill associated with the greatest score as the data to be output to the user.

A system that does not implement the post-NLU ranker 895 may select the highest scored NLU hypothesis in the NLU results data 885. The system may send the NLU hypothesis to a skill component 590 associated therewith along with a request for output data. In some situations, the skill component 590 may not be able to provide the system with output data. This results in the system indicating to the user that the user input could not be processed even though another skill associated with lower ranked NLU hypothesis could have provided output data responsive to the user input.

The post-NLU ranker 895 reduces instances of the aforementioned situation. As described, the post-NLU ranker 895 queries multiple skills associated with the NLU results data 885 to provide result data 830 to the post-NLU ranker 895 prior to the post-NLU ranker 895 ultimately determining the skill component 590 to be invoked to respond to the user input. Some of the skill components 590 may provide result data 830 indicating responses to NLU hypotheses while other skill components 590 may providing result data 830 indicating the skills cannot provide responsive data. Whereas a system not implementing the post-NLU ranker 895 may select one of the skill components 590 that could not provide a response, the post-NLU ranker 895 only selects a skill component 590 that provides the post-NLU ranker 895 with result data corresponding to a response, indicating further information is needed, or indicating multiple responses can be generated.

The post-NLU ranker 895 may select result data 830, associated with the skill component 590 associated with the highest score, for output to the user. Alternatively, the post-NLU ranker 895 may output ranked output data 825 indicating skill components 590 and their respective post-NLU ranker rankings. Since the post-NLU ranker 895 receives result data 830, potentially corresponding to a response to the user input, from the skill components 590 prior to post-NLU ranker 895 selecting one of the skills or outputting the ranked output data 825, little to no latency occurs from the time skills provide result data 830 and the time the system outputs responds to the user.

If the post-NLU ranker 895 selects result audio data to be output to a user and the system determines content should be output audibly, the post-NLU ranker 895 (or another component of the system(s) 120) may cause the device 110a and/or the device 110b to output audio corresponding to the result audio data. If the post-NLU ranker 895 selects result text data to output to a user and the system determines content should be output visually, the post-NLU ranker 895 (or another component of the system(s) 120) may cause the device 110b to display text corresponding to the result text data. If the post-NLU ranker 895 selects result audio data to output to a user and the system determines content should be output visually, the post-NLU ranker 895 (or another component of the system(s) 120) may send the result audio data to the ASR component 550. The ASR component 550 may generate output text data corresponding to the result audio data. The system(s) 120 may then cause the device 110b to display text corresponding to the output text data. If the post-NLU ranker 895 selects result text data to output to a user and the system determines content should be output audibly, the post-NLU ranker 895 (or another component of the system(s) 120) may send the result text data to the TTS component 580. The TTS component 580 may generate output audio data (corresponding to computer-generated speech) based on the result text data. The system(s) 120 may then cause the device 110a and/or the device 110b to output audio corresponding to the output audio data.

As described, a skill component 590 may provide result data 830 either indicating a response to the user input, indicating more information is needed for the skill component 590 to provide a response to the user input, or indicating the skill component 590 cannot provide a response to the user input. If the skill component 590 associated with the highest post-NLU ranker score provides the post-NLU ranker 895 with result data 830 indicating a response to the user input, the post-NLU ranker 895 (or another component of the system(s) 120, such as the orchestrator component 530) may simply cause content corresponding to the result data 830 to be output to the user. For example, the post-NLU ranker 895 may send the result data 830 to the orchestrator component 530. The orchestrator component 530 may cause the result data 830 to be sent to the device (110*a*/110*b*), which may output audio and/or display text corresponding to the result data 830. The orchestrator component 530 may send the result data 830 to the ASR component 550 to generate output text data and/or may send the result data 830 to the TTS component 580 to generate output audio data, depending on the situation.

The skill component 590 associated with the highest post-NLU ranker score may provide the post-NLU ranker 895 with result data 830 indicating more information is needed as well as instruction data. The instruction data may indicate how the skill component 590 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 895 may simply cause the received instruction data be output by the device (110*a*/110*b*). Alternatively, the instruction data may be in a format that is not capable of being output by the device (110*a*/110*b*). When this occurs, the post-NLU ranker 895 may cause the ASR component 550 or the TTS component 580 to process the instruction data, depending on the situation, to generate instruction data that may be output by the device (110*a*/110*b*). Once the user provides the system with all further information needed by the skill component 590, the skill component 590 may provide the system with result data 830 indicating a response to the user input, which may be output by the system as detailed above.

The system may include "informational" skill components 590 that simply provide the system with information, which the system outputs to the user. The system may also include "transactional" skill components 590 that require a system instruction to execute the user input. Transactional skill components 590 include ride sharing skills, flight booking skills, etc. A transactional skill component 590 may simply provide the post-NLU ranker 895 with result data 830 indicating the transactional skill component 590 can execute the user input. The post-NLU ranker 895 may then cause the system to solicit the user for an indication that the system is permitted to cause the transactional skill component 590 to execute the user input. The user-provided indication may be an audible indication or a tactile indication (e.g., activation of a virtual button or input of text via a virtual keyboard). In response to receiving the user-provided indication, the system may provide the transactional skill component 590 with data corresponding to the indication. In response, the transactional skill component 590 may execute the command (e.g., book a flight, book a train ticket, etc.). Thus, while the system may not further engage an informational skill component 590 after the informational skill component 590 provides the post-NLU ranker 895 with result data 830, the system may further engage a transactional skill component 590 after the transactional skill component 590 provides the post-NLU ranker 895 with result data 830 indicating the transactional skill component 590 may execute the user input.

In some instances, the post-NLU ranker 895 may generate respective scores for first and second skills that are too close (e.g., are not different by at least a threshold difference) for the post-NLU ranker 895 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 530, post-NLU ranker 895, shortlister component 750, or other component may be trained and operated according to various machine learning techniques.

Figure 9:
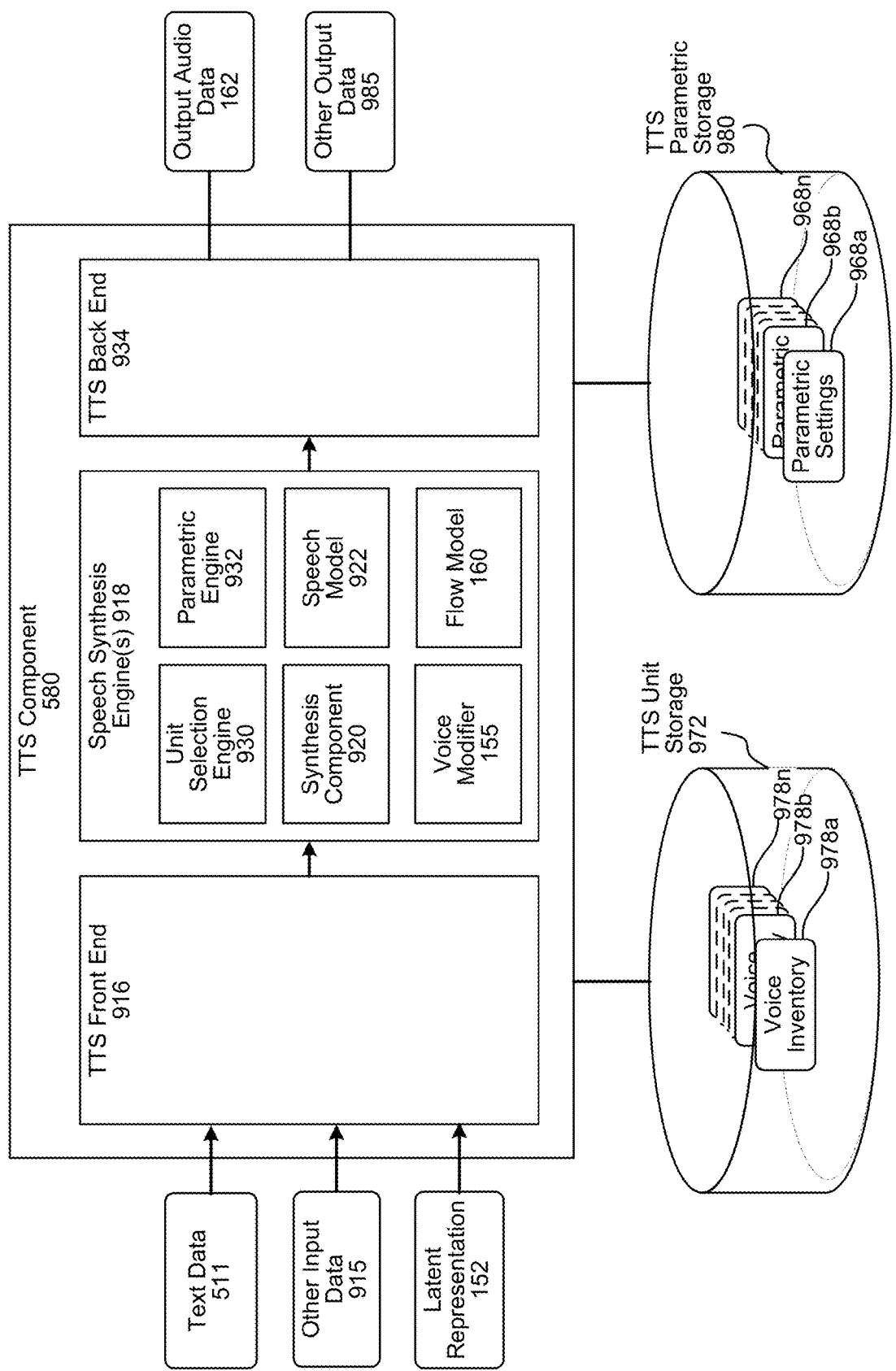
FIG. 9 is a conceptual diagram of text-to-speech components according to embodiments of the present disclosure.

FIG. 9 is a conceptual diagram of components of the TTS component 580 according to embodiments of the present disclosure. As shown in FIG. 9, the TTS component 580 may include a TTS front end 916, a speech synthesis engine 918, TTS unit storage 972, TTS parametric storage 980, and a TTS back end 934. The TTS unit storage 972 may include, among other things, voice inventories 978*a*-978*n* that may include pre-recorded audio segments (called units) to be used by the unit selection engine 930 when performing unit selection synthesis as described below. The TTS parametric storage 980 may include, among other things, parametric settings 968*a*-968*n* that may be used by the parametric synthesis engine 932 when performing parametric synthesis as described below. A particular set of parametric settings 968 may correspond to a particular voice profile (e.g., whispered speech, excited speech, etc.).

The TTS component 580 receives text data 511. Although the text data 511 in FIG. 9 is input into the TTS component 580, it may be output by other component(s) (such as a skill component 590, NLU component 560, NLG component 579, and/or other component) and may be intended for output by the system. Thus in certain instances text data 511 may be referred to as "output text data." Further, the output data 511 may not necessarily be text, but may include other data (such as symbols, code, other data, etc.) that may reference text (such as an indicator of a word) that is to be synthesized. Thus data 511 may come in a variety of forms. The TTS front end 916 may transform the text data 511 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine(s) 918. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 511, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 916 may also process other input data 915, such as speech attribute data 156 and/or 536. The other input data 915 may include additional information including, for example, text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 511 and/or the text for a TTS request may be accompanied by separate metadata indicating what text should be whispered (or have some other indicated audio characteristic). The speech synthesis engine 918 may compare the annotated phonetic units models and information stored in the TTS unit storage 972 and/or TTS parametric storage 980 for converting the input text into speech. The TTS front end 916 and speech synthesis engine 918 may include their own controller(s)/processor(s) and memory or they may use the controller/processor and memory of the server 120, device 110, or other device, for example. Similarly, the instructions for operating the TTS front end 916 and speech synthesis engine 918 may be located within the TTS component 580, within the memory and/or storage of the server 120, device 110, or within an external device.

Text data 511 input into the TTS component 580 may be sent to the TTS front end 916 for processing. The front end 916 may include components for performing text normalization, linguistic analysis, linguistic prosody generation, or other such components. During text normalization, the TTS front end 916 may first process the text input and generate standard text, converting such things as numbers, abbreviations (such as Apt., St., etc.), symbols ($, %, etc.) into the equivalent of written out words.

During linguistic analysis, the TTS front end 916 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 580 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 972. The linguistic analysis performed by the TTS front end 916 may also identify different grammatical components such as prefixes, suffixes, phrases, punctuation, syntactic boundaries, or the like. Such grammatical components may be used by the TTS component 580 to craft a natural-sounding audio waveform output. The language dictionary may also include letter-to-sound rules and other tools that may be used to pronounce previously unidentified words or letter combinations that may be encountered by the TTS component 580. Generally, the more information included in the language dictionary, the higher quality the speech output.

Based on the linguistic analysis the TTS front end 916 may then perform linguistic prosody generation where the phonetic units are annotated with desired prosodic characteristics, also called acoustic features, which indicate how the desired phonetic units are to be pronounced in the eventual output speech. During this stage the TTS front end 916 may consider and incorporate any prosodic annotations that accompanied the text input to the TTS component 580. Such acoustic features may include syllable-level features, word-level features, emotion, speaker, accent, language, pitch, energy, duration, and the like. Application of acoustic features may be based on prosodic models available to the TTS component 580. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 916, which may be referred to as a symbolic linguistic representation, may include a sequence of phonetic units annotated with prosodic characteristics. This symbolic linguistic representation may be sent to the speech synthesis engine 918, which may also be known as a synthesizer, for conversion into an audio waveform of speech for output to an audio output device and eventually to a user. The speech synthesis engine 918 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 918 may perform speech synthesis using various methods. In some embodiments of the present disclosure, model-based synthesis of audio data may be performed using one or more speech model(s) 922. The speech model(s) 922 may be used to synthesize speech based on trained machine learning models; for example, and possibly without data from the TTS unit storage 972 and/or the TTS parametric storage 980. In some implementations, however, the TTS parametric storage 980 may store parameters of the one or more machine learning models. In the case of model-based synthesis, the TTS front end 916 may be and/or operate the same as for unit selection-based synthesis. In other embodiments, some or all of the components of the TTS front end 916 may be based on other trained models. The present disclosure is not, however, limited to any particular type of TTS front end 916.

In some implementations, the speech synthesis engine(s) 918 may include the voice modifier component 155 and/or flow model 160 as previously described. The TTS component 580 may receive the latent representation 152 and process it using the flow model 160 to generate the output audio data 162. The flow model 160 may receive speech attribute data 156 (e.g., in the other input data 915 and/or from the voice modifier component 155) and use it to generate the output audio data 162. The voice modifier component 155 may retrieve speech attribute data 156 from the TTS unit storage 972 and/or the TTS parametric storage 980 to generate synthesized speech having voice characteristics selected by a user of the device 110.

Another method of synthesis is called unit selection, described further below, a unit selection engine 930 matches the symbolic linguistic representation created by the TTS front end 916 against a database of recorded speech, such as a database (e.g., TTS unit storage 972) storing information regarding one or more voice corpuses (e.g., voice inventories 978a-n). Each voice inventory may correspond to various segments of audio that was recorded by a speaking human, such as a voice actor, where the segments are stored in an individual inventory 978 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 930 may then use the information about each unit to select units to be joined together to form the speech output.

The unit selection engine 930 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 920) to form output audio data 162 representing synthesized speech. Using all the information in the unit database, a unit selection engine 930 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 932, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 920) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 580 may be configured to perform TTS processing in multiple languages. For each language, the TTS component 580 may include specially configured data, instructions and/or components to synthesize speech in the desired language(s). To improve performance, the TTS component 580 may revise/update the contents of the TTS unit storage 972 based on feedback of the results of TTS processing, thus enabling the TTS component 580 to improve speech synthesis.

The TTS unit storage 972 may be customized for an individual user based on his/her individualized desired speech output. In particular, the speech unit stored in a unit database may be taken from input audio data of the user speaking. For example, to create the customized speech output of the system, the system may be configured with multiple voice inventories 978a-978n, where each unit database is configured with a different "voice" to match desired speech qualities. Such voice inventories may also be linked to user accounts. The voice selected by the TTS component 580 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 978 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 968) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 930 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 930. As part of unit selection, the unit selection engine 930 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 972 or in another storage component. For example, different unit selection databases may be stored in TTS unit storage 972. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 918 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 580 may include an acoustic model, or other models, which may convert a symbolic linguistic representation into a synthetic acoustic waveform of the text input based on audio signal manipulation. The acoustic model includes rules which may be used by the parametric synthesis engine 932 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 916.

The parametric synthesis engine 932 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 918, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 932 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 932 may lead to a number of potential audio output sequences. Based on the acoustic model and other potential models, the potential audio output sequences may be scored according to a confidence level of the parametric synthesis engine 932. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 968, which may represent acoustic settings matching a particular parametric "voice", may be used by the synthesis component 920 to ultimately create the output audio data 162.

When performing unit selection, after a unit is selected by the unit selection engine 930, the audio data corresponding to the unit may be passed to the synthesis component 920. The synthesis component 920 may then process the audio data of the unit to create modified audio data where the modified audio data reflects a desired audio quality. The synthesis component 920 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 580. For each unit that corresponds to the selected portion, the synthesis component 920 may process the audio data for that unit to create a modified unit audio data. The modified unit audio data may then be concatenated to form the output audio data 162. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 580. In that case, other output data 985 may be output along with the output audio data 162 so that an ultimate playback device (e.g., device 110) receives instructions for playback that can assist in creating the desired output audio. Thus, the other output data 985 may include instructions or other data indicating playback device settings (such as volume, playback rate, etc.) or other data indicating how output audio data including synthesized speech should be output. For example, for whispered speech, the output audio data 162 may include other output data 985 that may include a prosody tag or other indicator that instructs the device 110 to slow down the playback of the output audio data 162, thus making the ultimate audio sound more like whispered speech, which is typically slower than normal speech. In another example, the other output data 985 may include a volume tag that instructs the device 110 to output the speech at a volume level less than a current volume setting of the device 110, thus improving the quiet whisper effect.

Various machine learning techniques may be used to train and operate models to perform various steps described herein, such as wakeword detection, phoneme encoding/decoding, ASR, NLU, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 10 is a block diagram conceptually illustrating a device 110 that may be used with the system. FIG. 11 is a block diagram conceptually illustrating example components of a remote device, such as the natural language command processing system 120, which may assist with ASR processing, NLU processing, etc., and a skill support system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/525) may be included in the overall system 100 of the present disclosure, such as one or more natural language processing systems 120 for performing ASR processing, one or more natural language processing systems 120 for performing NLU processing, one or more skill support systems 525, etc. In operation, each of these systems may include computer-readable and computer-executable instructions that reside on the respective device (120/525), as will be discussed further below.

Each of these devices (110/120/525) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/525) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1002/1102).

Computer instructions for operating each device (110/120/525) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/525) includes input/output device interfaces (1002/1102). A variety of components may be connected through the input/output device interfaces (1002/1102), as will be discussed further below. Additionally, each device (110/120/525) may include an address/data bus (1024/1124) for conveying data among components of the respective device. Each component within a device (110/120/525) may also be directly connected to other components in addition to (or instead of) being connected to other components across the bus (1024/1124).

Referring to FIG. 10, the device 110 may include input/output device interfaces 1002 that connect to a variety of components such as an audio output component such as a loudspeaker 112, a wired headset or a wireless headset (not illustrated), or other component capable of outputting audio. The device 110 may also include an audio capture component. The audio capture component may be, for example, a microphone 114 or array of microphones 114, a wired headset or a wireless headset (not illustrated), etc. If an array of microphones 114 is included, approximate distance to a sound's point of origin may be determined by acoustic localization based on time and amplitude differences between sounds captured by different microphones 114 of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system 120, or a skill support system 525 may include their own dedicated processors, memory, and/or storage. Alternatively, one or more of the components of the device(s) 110, the natural language command processing system 120, or a skill support system 525 may utilize the I/O interfaces (1002/1102), processor(s) (1004/1104), memory (1006/1106), and/or storage (1008/1108) of the device(s) 110, natural language command processing system 120, or the skill support system 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill support system 525, as described herein, are illustrative, and may be located as a stand-alone device or may be included, in whole or in part, as a component of a larger device or system. As can be appreciated, a number of components may exist either on a system 120 and/or on device 110. For example, language processing component 592 (which may include the ASR component 550 and/or the NLU component 560), language output components 593 (which may include the NLG component 579 and/or the TTS component 580), etc., for example as illustrated in FIG. 5. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 12, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device with display 110a, a speech detection device 110b, a smart watch 110c, a tablet computer 110d, a vehicle 110e, a smart phone 110f, a display/smart television 110g, a washer/dryer 110h, a refrigerator 110i, a microwave 110j, autonomously motile device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill support system(s) 525, and/or others. The support devices may connect to the network(s) 199 through a wired connection or wireless connection. Networked devices may capture audio using one-or-more built-in or connected microphones 114 or other audio capture devices, with processing performed by ASR components, NLU components, or other components of the same device or another device connected via the network(s) 199, such as the ASR component 550, the NLU component 560, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving first audio data representing first human speech;
processing the first audio data to determine first spectrogram data representing the first human speech;
processing the first spectrogram data to determine first speech attribute data, the first speech attribute data representing first voice characteristics of the first human speech;
processing the first spectrogram data using a first flow model and the first speech attribute data to generate first data having a Gaussian distribution, the first data representing a latent representation of the first spectrogram data;
performing data compression on the first data to generate first compressed data such that the first compressed data is represented using fewer bytes of data than used to represent the first data;
receiving the first compressed data;
decompressing the first compressed data to determine second data representing the latent representation;
receiving second speech attribute data corresponding to desired voice characteristics for synthesized speech;
processing the second data using a second flow model and the second speech attribute data to generate second spectrogram data, the second flow model corresponding to an inverse of the first flow model; and
processing the second spectrogram data with a vocoder to generate an audio signal representing synthesized speech having the desired voice characteristics.

2. The method of claim 1, further comprising:
receiving third spectrogram data corresponding to speech samples;
training a first neural network using the third spectrogram data to perform a first plurality of operations, wherein the first plurality of operations transform the third spectrogram data into a second latent representation approximating a Gaussian distribution, and wherein the first flow model includes the first neural network; and
determining a second neural network that performs a second plurality of operations representing an inverse of the first plurality of operations, wherein the second flow model includes the second neural network.

3. The method of claim 1, further comprising:
generating, using the first speech attribute data, the second speech attribute data representing at least one modified attribute of the first speech attribute data, the second speech attribute data representing second voice characteristics different from the first voice characteristics, wherein the synthesized speech corresponds to the second voice characteristics.

4. The method of claim 1, further comprising:
determining to anonymize the first human speech; and
in response to determining to anonymize the first human speech, determining to process the second data using the second speech attribute data, wherein:
the second speech attribute data represent default speech attribute data for processing latent representations, and
the second spectrogram data represents the first human speech modified to remove speaker-identifying attributes.

5. A method comprising:
receiving first audio data representing first speech;
receiving first data representing first voice characteristics of the first speech;
processing the first audio data using a first model and the first data to generate second data representing a latent representation of the first speech, the first model representing a density-based model;
performing data compression on the second data to generate first compressed data;
decompressing the first compressed data to determine second data representing the latent representation of the first speech;
receiving third data representing second voice characteristics for synthesized speech;
processing the second data using a second model and the third data to generate second audio data, the second model representing an inverse of the first model; and
generating, using the second audio data, an audio signal representing synthesized speech, the synthesized speech corresponding to the second voice characteristics.

6. The method of claim 5, further comprising:
receiving third audio data corresponding to speech samples;
training a first neural network using the third audio data to perform a first plurality of operations, wherein the first plurality of operations transform the third audio data into a second latent representation approximating a predetermined variable distribution, and wherein the first model includes the first neural network; and
determining a second neural network that performs a second plurality of operations representing an inverse of the first plurality of operations, wherein the second model includes the second neural network.

7. The method of claim 5, further comprising:
processing the first audio data with a neural network encoder to determine the first data; and generating, using the first data, the third data such that the second voice characteristics differ from the first voice characteristics.

8. The method of claim 5, further comprising:
determining to anonymize the first speech; and
in response to determining to anonymize the first speech, determining to process the second data using the third data, wherein the third data represents default voice characteristics for generating synthesized speech.

9. The method of claim 5, further comprising:
receiving first video data;
processing the first video data with the first model to generate fourth data representing a latent representation of the first video data;
performing data compression on the fourth data to generate second compressed data;
decompressing the second compressed data to determine fifth data representing the latent representation of the first video data;
processing the fifth data using the second model to generate second video data; and
causing a device to display the second video data.

10. The method of claim 5, further comprising:
determining to modify the first voice characteristics of the first speech; and
in response to determining modify the first voice characteristics of the first speech, generating, using the first data, the third data such that the second voice characteristics differ from the first voice characteristics.

11. The method of claim 5, wherein the first audio data has a first variable distribution, and the method further comprises:
configuring the first model to transform the first audio data to generate the second data such that the second data has a second variable distribution different from the first variable distribution.

12. The method of claim 11, wherein:
the second variable distribution approximates a Gaussian distribution.

13. A system, comprising:
at least one processor; and
at least one memory comprising instructions that, when executed by the at least one processor, cause the system to:
receive first audio data representing first speech;
receive first data representing first voice characteristics of the first speech;
process the first audio data using a first model and the first data to generate second data representing a latent representation of the first speech, the first model representing a density-based model;
perform data compression on the second data to generate first compressed data;
decompress the first compressed data to determine second data representing the latent representation of the first speech;
receive third data representing second voice characteristics for synthesized speech;
process the second data using a second model and the third data to generate second audio data, the second model representing an inverse of the first model; and
generate, using the second audio data, an audio signal representing synthesized speech, the synthesized speech corresponding to the second voice characteristics.

14. The system of claim 13, wherein the at least one memory further includes instructions that, when executed by the at least one processor, further cause the system to:
receive third audio data corresponding to speech samples;
train a first neural network using the third audio data to perform a first plurality of operations, wherein the first plurality of operations transform the third audio data into a second latent representation approximating a predetermined variable distribution, and wherein the first model includes the first neural network; and
determine a second neural network that performs a second plurality of operations representing an inverse of the first plurality of operations, wherein the second model includes the second neural network.

15. The system of claim 13, wherein the at least one memory further includes instructions that, when executed by the at least one processor, further cause the system to:
process the first audio data with a neural network encoder to determine the first data; and
generate, using the first data, the third data such that the second voice characteristics differ from the first voice characteristics.

16. The system of claim 13, wherein the at least one memory further includes instructions that, when executed by the at least one processor, further cause the system to:
determine to anonymize the first speech; and
in response to determining to anonymize the first speech, determine to process the second data using the third data, wherein the third data represents default voice characteristics for generating synthesized speech.

17. The system of claim 13, wherein the at least one memory further includes instructions that, when executed by the at least one processor, further cause the system to:
receive first video data;
process the first video data with the first model to generate fourth data representing a latent representation of the first video data;
perform data compression on the fourth data to generate second compressed data;
decompress the second compressed data to determine fifth data representing the latent representation of the first video data;
process the fifth data using the second model to generate second video data; and
cause a device to display the second video data.

18. The system of claim 13, wherein the at least one memory further includes instructions that, when executed by the at least one processor, further cause the system to:
determine to modify the first voice characteristics of the first speech; and
in response to determining modify the first voice characteristics of the first speech, generate, using the first data, the third data such that the second voice characteristics differ from the first voice characteristics.

19. The system of claim 13, wherein the first audio data has a first variable distribution, and the at least one memory further includes instructions that, when executed by the at least one processor, further cause the system to:
configure the first model to transform the first audio data to generate the second data such that the second data has a second variable distribution different from the first variable distribution.

20. The system of claim 19, wherein:
the second variable distribution approximates a Gaussian distribution.

* * * * *